(12) United States Patent
Kamitani et al.

(10) Patent No.: US 11,434,554 B2
(45) Date of Patent: Sep. 6, 2022

(54) STEEL MATERIAL SUITABLE FOR USE IN SOUR ENVIRONMENT

(71) Applicant: NIPPON STEEL CORPORATION, Tokyo (JP)

(72) Inventors: Hiroki Kamitani, Tokyo (JP); Atsushi Soma, Tokyo (JP); Keiichi Kondo, Tokyo (JP); Shinji Yoshida, Tokyo (JP); Yuji Arai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 8 days.

(21) Appl. No.: 17/044,616

(22) PCT Filed: Mar. 22, 2019

(86) PCT No.: PCT/JP2019/012243
§ 371 (c)(1),
(2) Date: Oct. 1, 2020

(87) PCT Pub. No.: WO2019/198468
PCT Pub. Date: Oct. 17, 2019

(65) Prior Publication Data
US 2021/0198775 A1    Jul. 1, 2021

(30) Foreign Application Priority Data

Apr. 9, 2018    (JP) .............................. JP2018-074783
Apr. 9, 2018    (JP) .............................. JP2018-074784
(Continued)

(51) Int. Cl.
*C22C 38/32*    (2006.01)
*C22C 38/02*    (2006.01)
(Continued)

(52) U.S. Cl.
CPC .............. *C22C 38/32* (2013.01); *C22C 38/02* (2013.01); *C22C 38/04* (2013.01); *C22C 38/06* (2013.01);
(Continued)

(58) Field of Classification Search
None
See application file for complete search history.

(56) References Cited

U.S. PATENT DOCUMENTS

2007/0137736 A1    6/2007    Omura et al.
2011/0315276 A1    12/2011    Bosch et al.
(Continued)

FOREIGN PATENT DOCUMENTS

EP    2796587 A1    10/2014
JP    59232220 A    12/1984
(Continued)

OTHER PUBLICATIONS

English language translation of JP H08-311551, translation from JPO on Jun. 7, 2022 (Year: 1996).*

*Primary Examiner* — Elizabeth Collister
(74) *Attorney, Agent, or Firm* — Greer, Burns & Crain, Ltd.

(57) ABSTRACT

The steel material according to the present disclosure contains a chemical composition consisting of, in mass %, C: 0.20 to 0.50%, Si: 0.05 to 0.50%, Mn: 0.05 to 1.00%, P: 0.030% or less, S: less than 0.0050%, Al: 0.005 to 0.050%, Cr: 0.10 to 1.50%, Mo: 0.25 to 1.80%, Ti: 0.002 to 0.050%, Nb: 0.002 to 0.100%, B: 0.0001 to 0.0050%, N: 0.0070% or less and O: less than 0.0050% with the balance being Fe and impurities. A yield strength is within a range of 655 to 1069 MPa, and a yield ratio is 85% or more. A proportion of KAM values of 1° or less is 30 area % or more.

11 Claims, 1 Drawing Sheet

(30) Foreign Application Priority Data

Apr. 9, 2018 (JP) .............................. JP2018-074982
Apr. 9, 2018 (JP) .............................. JP2018-074983

(51) Int. Cl.
*C22C 38/04* (2006.01)
*C22C 38/06* (2006.01)
*C22C 38/22* (2006.01)
*C22C 38/26* (2006.01)
*C22C 38/28* (2006.01)

(52) U.S. Cl.
CPC .............. *C22C 38/22* (2013.01); *C22C 38/26* (2013.01); *C22C 38/28* (2013.01)

(56) References Cited

U.S. PATENT DOCUMENTS

| | | | |
|---|---|---|---|
| 2013/0199676 A1* | 8/2013 | Tomokiyo | C21D 8/0236 148/518 |
| 2013/0292009 A1* | 11/2013 | Hayashi | C22C 38/04 148/518 |
| 2014/0352836 A1* | 12/2014 | Eguchi | C21D 8/105 138/177 |
| 2015/0086808 A1* | 3/2015 | Kasuya | C23C 2/28 428/659 |
| 2019/0382864 A1* | 12/2019 | Cho | C22C 38/38 |

FOREIGN PATENT DOCUMENTS

| | | | | |
|---|---|---|---|---|
| JP | 62253720 A | | 11/1987 | |
| JP | 06322478 A | | 11/1994 | |
| JP | 08311551 A | * | 11/1996 | ............ B21B 23/00 |
| JP | 2000256783 A | | 9/2000 | |
| JP | 2000297344 A | | 10/2000 | |
| JP | 2005350754 A | | 12/2005 | |
| JP | 2010255090 A | | 11/2010 | |
| JP | 2012026030 A | | 2/2012 | |
| JP | 2012519238 A | | 8/2012 | |

\* cited by examiner

STEEL MATERIAL SUITABLE FOR USE IN SOUR ENVIRONMENT

This is a National Phase Application filed under 35 U.S.C. § 371, of International Application No. PCT/JP2019/012243, filed Mar. 22, 2019, the contents of which are incorporated by reference.

TECHNICAL FIELD

The present invention relates to a steel material, and more particularly relates to a steel material suitable for use in a sour environment.

BACKGROUND ART

Due to the deepening of oil wells and gas wells (hereunder, oil wells and gas wells are collectively referred to as "oil wells"), there is a demand to enhance the strength of oil well steel materials represented by oil-well steel pipes. Specifically, for example, 80 ksi grade (yield strength is 80 to less than 95 ksi, that is, 552 to less than 655 MPa) and 95 ksi grade (yield strength is 95 to less than 110 ksi, that is, 655 to less than 758 MPa) oil-well steel pipes are being widely utilized, and recently requests are also starting to be made for 110 ksi grade (yield strength is 110 to less than 125 ksi, that is, 758 to less than 862 MPa), 125 ksi grade (yield strength is 125 to less than 140 ksi, that is, 862 to less than 965 MPa), and 140 ksi grade (yield strength is 140 to 155 ksi, that is, 965 to 1069 MPa) oil-well steel pipes.

Most deep wells are in a sour environment containing corrosive hydrogen sulfide. In the present description, the term "sour environment" means an acidified environment containing hydrogen sulfide. Note that, in some cases a sour environment may also contain carbon dioxide. Oil-well steel pipes for use in such sour environments are required to have not only high strength, but to also have sulfide stress cracking resistance (hereunder, referred to as "SSC resistance").

Technology for enhancing the SSC resistance of oil-well steel materials as typified by oil-well steel pipes is disclosed in Japanese Patent Application Publication No. 62-253720 (Patent Literature 1), Japanese Patent Application Publication No. 59-232220 (Patent Literature 2), Japanese Patent Application Publication No. 06-322478 (Patent Literature 3), Japanese Patent Application Publication No. 08-311551 (Patent Literature 4), Japanese Patent Application Publication No. 2000-256783 (Patent Literature 5), Japanese Patent Application Publication No. 2000-297344 (Patent Literature 6), Japanese Patent Application Publication No. 2005-350754 (Patent Literature 7), National Publication of International Patent Application No. 2012-519238 (Patent Literature 8), and Japanese Patent Application Publication No. 2012-26030 (Patent Literature 9).

Patent Literature 1 proposes a method for reducing impurities such as Mn and P and thereby increasing an SSC resistance of an oil-well steel. Patent Literature 2 proposes a method for performing quenching twice to refine crystal grains and thereby increasing an SSC resistance of a steel. Patent Literature 3 proposes a method for performing induction heating treatment to refine a steel micro-structure, and thereby increasing an SSC resistance of a steel material of 125 ksi grade. Patent Literature 4 proposes a method for increasing a hardenability of steel by using a direct quenching process and increasing a tempering temperature to increase an SSC resistance of a steel pipe of a 110 ksi grade to 140 ksi grade.

Patent Literature 5 and Patent Literature 6 each propose methods for controlling forms of carbides and thereby increasing an SSC resistance of a steel for low-alloy oil country tubular goods of 110 to 140 ksi grade. Patent Literature 7 proposes a method for controlling a dislocation density and a hydrogen diffusion coefficient so that they show desired values, and thereby increasing an SSC resistance of a steel material of 125 ksi grade or more. Patent Literature 8 proposes a method for performing quenching a plurality of times on a low alloy steel that contains 0.3 to 0.5% of C and thereby increasing an SSC resistance of a steel of 125 ksi grade. Patent Literature 9 proposes a method for employing a tempering process including two-stage heat treatment and thereby controlling morphology or a number of carbides. More specifically, in Patent Literature 9, a number density of large $M_3C$ or $M_2C$ is suppressed, and an SSC resistance of a steel of 125 ksi grade is thereby increased.

CITATION LIST

Patent Literature

Patent Literature 1: Japanese Patent Application Publication No. 62-253720
Patent Literature 2: Japanese Patent Application Publication No. 59-232220
Patent Literature 3: Japanese Patent Application Publication No. 6-322478
Patent Literature 4: Japanese Patent Application Publication No. 8-311551
Patent Literature 5: Japanese Patent Application Publication No. 2000-256783
Patent Literature 6: Japanese Patent Application Publication No. 2000-297344
Patent Literature 7: Japanese Patent Application Publication No. 2005-350754
Patent Literature 8: National Publication of International Patent Application No. 2012-519238
Patent Literature 9: Japanese Patent Application Publication No. 2012-26030

SUMMARY OF INVENTION

Technical Problem

As described above, accompanying the increasing severity of oil well environments in recent years, there is a demand for oil-well steel pipes that are more excellent in SSC resistance than the conventional oil-well steel pipes. Therefore, a steel material (e.g., oil-well steel pipe) having a yield strength of 95 to 140 ksi grade (655 to 1069 MPa) and excellent SSC resistance may be obtained by a technique other than the techniques disclosed in the above Patent Literature 1 to 9.

An objective of the present disclosure is to provide a steel material that has a yield strength of 655 to 1069 MPa (95 to 155 ksi, 95 to 140 ksi grade) and that also has excellent SSC resistance.

Solution to Problem

A steel material according to the present disclosure contains a chemical composition consisting of, in mass %, C: 0.20 to 0.50%, Si: 0.05 to 0.50%, Mn: 0.05 to 1.00%, P: 0.030% or less, S: less than 0.0050%, Al: 0.005 to 0.050%, Cr: 0.10 to 1.50%, Mo: 0.25 to 1.80%, Ti: 0.002 to 0.050%, Nb: 0.002 to 0.100%, B: 0.0001 to 0.0050%, N: 0.0070% or less, 0: less than 0.0050%, V: 0 to 0.30%, Ca: 0 to 0.0100%, Mg: 0 to 0.0100%, Zr: 0 to 0.0100%, rare earth metal: 0 to 0.0100%, Co: 0 to 1.50%, W: 0 to 1.50%, Ni: 0 to 0.50%, and Cu 0 to 0.50%, with the balance being Fe and impurities. A yield strength is within a range of 655 to 1069 MPa, and a yield ratio is 85% or more. A proportion of KAM values of 1° or less is 30 area % or more.

In a case where the yield strength is within a range of 655 to less than 862 MPa, the proportion of KAM values of 1° or less is 40 area % or more.

In a case where the yield strength is within a range of 862 to less than 965 MPa, the proportion of KAM values of 1° or less is 35 area % or more.

In a case where the yield strength is within a range of 965 to 1069 MPa, the proportion of KAM values of 1° or less is 30 area % or more.

Advantageous Effects of Invention

The steel material according to the present disclosure has a yield strength in a range of 655 to 1069 MPa (95 to 155 ksi, 95 to 140 ksi grade), and also has excellent SSC resistance.

DESCRIPTION OF EMBODIMENTS

Figure 1A:
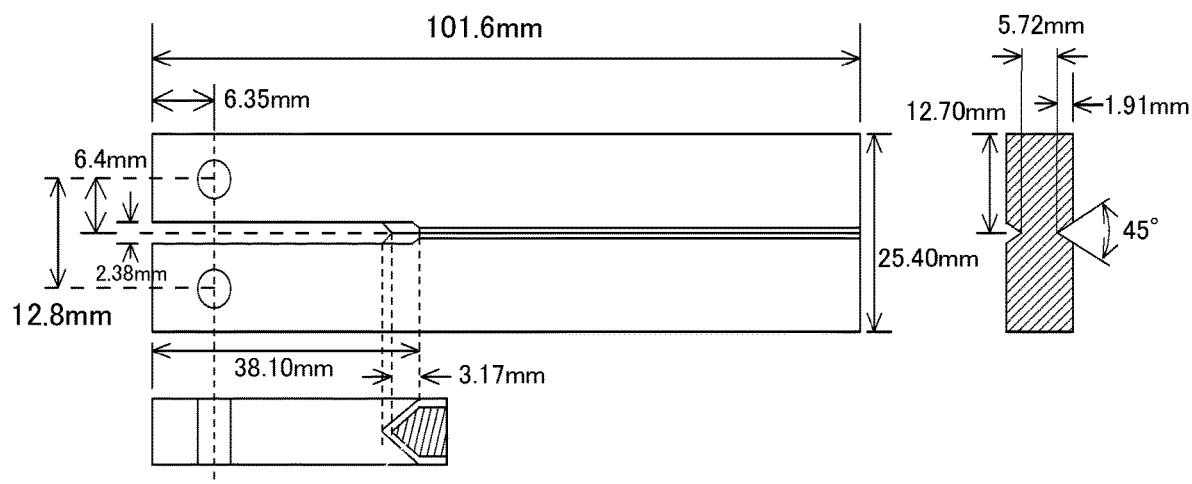
FIG. 1A is a side view and a cross-sectional view of a DCB test specimen used in a DCB test in an embodiment.

The present inventors conducted investigations and studies regarding a method for obtaining both a yield strength in a range of 655 to 1069 MPa (95 to 155 ksi, 95 to 140 ksi grade) and excellent SSC resistance for a steel material that is assumed to be used in a sour environment, and found the following findings.

Many studies have been conducted regarding a relation between dislocation density and SSC resistance for a steel material that is assumed to be used in a sour environment. Specifically, if the dislocation density in the steel material is increased, the yield strength of the steel material will increase. On the other hand, there is a possibility that dislocations will occlude hydrogen. Therefore, in a case where the dislocation density of the steel material is increased for the purpose of increasing the yield strength of the steel material, there is a possibility that the SSC resistance of the steel material will decrease.

Conventionally, a mechanism by which the SSC resistance of the steel material will decrease as a result of increasing the dislocation density has been considered as follows. Dislocation is a type of lattice defects arising in a crystal lattice of the microstructure of the steel material. It has been considered that the dislocations are liable to occlude hydrogen. Therefore, it has been considered that steel material having a high dislocation density is liable to occlude hydrogen and the SSC resistance will decrease.

On the other hand, in a microstructure of steel material, microscopic strain occurs in a crystal in some cases due to a cause other than dislocations. For example, there is a possibility that microscopic strain will occur in a crystal in the microstructure of the steel material by a dissolved element. For example, further, in a case where a precipitate and inclusions exist in the microstructure of the steel material, there is a possibility that microscopic strain will occur in a crystal at an interface between the precipitate or the like and a base metal.

As seen from the above, the occurrence of the microscopic strain in a crystal in the microstructure of the steel material is not solely due to dislocations. It is considered that the microscopic strain occurs in a crystal in the microstructure of the steel material by combined actions of a plurality of factors such as the dislocations, the dissolved element, the precipitate, the inclusions, and the like, as well as numbers of them, degrees of dispersion of them, and the like. Further, there is a possibility that the microscopic strain in a crystal in the microstructure of the steel material will influence the SSC resistance of the steel material.

Therefore, the present inventors conducted various studies regarding a method for observing the microscopic strain in a crystal in the microstructure of the steel material. As a result of the detailed studies, the present inventors focused their attention on a crystal orientation in the microstructure of the steel material. The crystal orientation can determine the microscopic strain of a crystal that occurs by the accumulation of the aforementioned combined factors.

Therefore, the present inventors conducted detailed investigations and studies regarding a relationship between crystal orientation and SSC resistance of a steel material that is assumed to be used in a sour environment and contains a chemical composition consisting of, in mass %, C: 0.20 to 0.50%, Si: 0.05 to 0.50%, Mn: 0.05 to 1.00%, P: 0.030% or less, S: less than 0.0050%, Al: 0.005 to 0.050%, Cr: 0.10 to 1.50%, Mo: 0.25 to 1.80%, Ti: 0.002 to 0.050%, Nb: 0.002 to 0.100%, B: 0.0001 to 0.0050%, N: 0.0070% or less, O: less than 0.0050%, V: 0 to 0.30%, Ca: 0 to 0.0100%, Mg: 0 to 0.0100%, Zr 0 to 0.0100%, rare earth metal: 0 to 0.0100%, Co: 0 to 1.50%, W: 0 to 1.50%, Ni: 0 to 0.50%, and Cu: 0 to 0.50%1, with the balance being Fe and impurities.

Specifically, the present inventors first focused their attention on a steel material containing the aforementioned chemical composition and a yield strength within a range of 965 to 1069 MPa (140 ksi grade) and conducted detailed investigations and studies regarding a relation between the crystal orientation and the SSC resistance of the steel material. The crystal orientation of the steel material containing the aforementioned chemical composition and the yield strength of 140 ksi grade was determined by EBSD (Electron Back Scattered Diffraction pattern) that is described later.

Next, the present inventors further conducted detailed studies regarding a relation between the determined crystal orientation and the microscopic strain in the crystal. As a result, the present inventors found that calculation of a deviation of the crystal orientation from surroundings can determine the microscopic strain in a crystal of the microstructure. That is, a distribution of strain is calculated rather than an average value of strain in the steel material as typified by the aforementioned dislocation density. As a result, for the steel material containing the aforementioned chemical composition and the yield strength of 140 ksi grade, the microscopic strain in a crystal of the microstructure can be determined.

Based on the above finding, the present inventors determined a KAM (Kernel Average Misorientation) value from the determined crystal orientation. The KAM value was defined as follows.

A visual field was divided on a basis of a regular hexagon pixel, and a given regular hexagon pixel in the visual field was selected as a center pixel. With respect to the selected center pixel and six pixels that were so disposed as to be adjacent to the outside of the center pixel, orientation differences between pixels were determined. The average value of the obtained orientation differences was determined, and the average value was defined as the KAM value of the center pixel.

That is, the KAM value defined as above is an index representing a deviation of a crystal orientation from surroundings in the microstructure of the steel material. Specifically, at a measurement point having a large KAM value, differences in the crystal orientation between in the surroundings and at the measurement point are large. In this case, at the measurement point, microscopic strain in a crystal is locally large. In contrast, at a measurement point having a small KAM value, differences in the crystal orientation between in the surroundings and at the measurement point are small. In this case, at the measurement point, the microscopic strain in the crystal is reduced.

Next, the present inventors conducted studies regarding determination of a distribution of the microscopic strain in a crystal using the KAM value. Specifically, the present inventors calculated the KAM value obtained at the given pixel such that the pixel does not extends across a grain boundary, and thereby created a map representing changes in crystal orientation in a crystal grain (KAM map). With the KAM map, a distribution of the microscopic strain in a crystal of the microstructure of the steel material can be visualized.

Based on the created KAM map, the present inventors conducted detailed studies regarding a relation between the distribution of the microscopic strain in a crystal and the SSC resistance in the steel material containing the aforementioned chemical composition and the yield strength of 140 ksi grade. Specifically, the present inventors created the above KAM map for the steel material containing the aforementioned chemical composition and the yield strength within the range of 965 to 1069 MPa (140 ksi grade), and creates a histogram obtained from the KAM map created by a method that is described later.

As a result, the present inventors found that there is a correlation between the proportion of areas having KAM values of 1° or less and the SSC resistance. More specifically, the present inventors found that, in the steel material containing the chemical composition according to the present embodiment and the yield strength of 140 ksi grade, the SSC resistance of the steel material can be increased by increasing the proportion of KAM values of 1° or less to 30 area/or more.

That is, by increasing the proportion of KAM values of 1° or less to 30 area % or more, the SSC resistance of the steel material can be increased while the yield strength is maintained at 140 ksi grade. Therefore, in the case where the steel material according to the present embodiment containing the aforementioned chemical composition has a yield strength of 140 ksi grade, the proportion of KAM values of 1 or less is set to 30 area % or more. As a result, both a yield strength of 140 ksi grade and excellent SSC resistance can be obtained.

The present inventors also conducted studies in a similar manner with respect to cases where the yield strengths are different. Specifically, the present inventors created the above KAM map regarding the case of the range of 862 to less than 965 MPa (125 ksi grade), and conducted investigations regarding the microscopic strain and the SSC resistance of the steel material.

As a result, the present inventors found that, in the steel material containing the chemical composition according to the present embodiment and the yield strength of 125 ksi grade, the SSC resistance of the steel material can be increased by increasing the proportion of KAM values of 1 or less to 35 area % or more.

That is, by increasing the proportion of KAM values of 1° or less to 35 area % or more, the SSC resistance of the steel material can be increased while the yield strength is maintained at 125 ksi grade. Therefore, in the case where the steel material according to the present embodiment containing the aforementioned chemical composition has a yield strength of 125 ksi grade, the proportion of KAM values of 1° or less is set to 35 area % or more. As a result, both a yield strength of 125 ksi grade and excellent SSC resistance can be obtained.

Further, the present inventors created the above KAM map regarding the case of the range of 655 to less than 862 MPa (95 ksi grade and 110 ksi grade), and conducted investigations regarding the microscopic strain and the SSC resistance of the steel material.

As a result, the present inventors found that, in the steel material containing the chemical composition according to the present embodiment and the yield strengths of 95 ksi grade and 110 ksi grade, the SSC resistance of the steel material can be increased by increasing the proportion of KAM values of 1 or less to 40 area % or more.

That is, by increasing the proportion of KAM values of 1° or less to 40 area % or more, the SSC resistance of the steel material can be increased while the yield strength is maintained at 95 ksi grade and 110 ksi grade. Therefore, in the case where the steel material according to the present embodiment containing the aforementioned chemical composition has yield strengths of 95 ksi grade and 110 ksi grade, the proportion of KAM values of 1° or less is set to 40 area % or more. As a result, both yield strengths of 95 ksi grade and 110 ksi grade, and excellent SSC resistance can be obtained.

Therefore, the steel material according to the present embodiment contains the aforementioned chemical composition, and the proportion of KAM values of 1° or less is increased in accordance with the intended yield strength (95 ksi grade, 110 ksi grade, 125 ksi grade, and 140 ksi grade). As a result, the steel material according to the present embodiment can obtain both desired yield strengths (95 ksi grade, 110 ksi grade, 125 ksi grade, and 140 ksi grade) and excellent SSC resistance.

Note that a microstructure of the steel material is principally composed of tempered martensite and tempered bainite. The term "being principally composed of tempered martensite and tempered bainite" means that the total of the volume ratios of tempered martensite and tempered bainite is 95% or more. If the microstructure of the steel material is principally composed of tempered martensite and tempered bainite, in the steel material according to the present embodiment, the yield strength is within the range of 655 to 1069 MPa (95 to 140 ksi grade), a yield ratio (a ratio of the yield strength to the tensile strength, that is, a yield ratio (YR)=yield strength (YS)/tensile strength (TS)) is 85% or more.

The steel material according to the present embodiment that was completed based on the above findings contains a chemical composition consisting of, in mass %, C: 0.20 to 0.50%, Si: 0.05 to 0.50%, Mn: 0.05 to 1.00%, P: 0.030% or less, S: less than 0.0050%, Al: 0.005 to 0.050%, Cr: 0.10 to 1.50%, Mo: 0.25 to 1.80%, Ti: 0.002 to 0.050%, Nb: 0.002 to 0.100%, B: 0.0001 to 0.0050%, N: 0.0070% or less, O: less than 0.0050%, V: 0 to 0.30%, Ca: 0 to 0.0100%, Mg: 0 to 0.0100%, Zr: 0 to 0.0100%, rare earth metal: 0 to 0.0100%, Co: 0 to 1.50%, W: 0 to 1.50%, Ni: 0 to 0.50%, and Cu: 0 to 0.50%, with the balance being Fe and impurities. A yield strength is within a range of 655 to 1069 MPa, and a yield ratio is 85% or more. A proportion of KAM values of 1° or less is 30 area % or more.

In a case where the yield strength is within a range of 655 to less than 862 MPa, the proportion of KAM values of 1° or less is 40 area % or more.

In a case where the yield strength is within a range of 862 to less than 965 MPa, the proportion of KAM values of 1 or less is 35 area % or more.

In a case where the yield strength is within a range of 965 to 1069 MPa, the proportion of KAM values of 1 or less is 30 area % or more.

In the present specification, although not particularly limited, the steel material is, for example, a steel pipe or a steel plate. The steel material is preferably an oil-well steel material used in an oil well and further preferably is an oil-well steel pipe. In the present specification, the term oil well is a collective term including oil wells and gas wells, as described above.

The aforementioned chemical composition may contain V: 0.01 to 0.30%.

The aforementioned chemical composition may contain one or more types of element selected from the group consisting of Ca: 0.0001 to 0.0100%, Mg: 0.0001 to 0.0100%, Zr: 0.0001 to 0.0100% and a rare earth metal in an amount of 0.0001 to 0.0100%.

The aforementioned chemical composition may contain one or more types of element selected from the group consisting of Co: 0.02 to 1.50% and W: 0.02 to 1.50%.

The aforementioned chemical composition may contain one or more types of element selected from a group consisting of Ni: 0.02 to 0.50% and Cu: 0.02 to 0.50%.

In the aforementioned steel material, the yield strength may be in a range of 655 to less than 758 MPa, the proportion of KAM values of 1° or less may be 40 area % or more.

In the aforementioned steel material, the yield strength may be in a range of 758 to less than 862 MPa, the proportion of KAM values of 1° or less may be 40 area % or more.

In the aforementioned steel material, the yield strength may be in a range of 862 to less than 965 MPa, the proportion of KAM values of 1° or less may be 35 area % or more.

In the aforementioned steel material, the yield strength may be in a range of 965 to 1069 MPa, the proportion of KAM values of 1° or less may be 30 area % or more.

The aforementioned steel material may be an oil-well steel pipe.

In the present description, the oil-well steel pipe may be a steel pipe that is used for a line pipe or may be a steel pipe used for oil country tubular goods. The oil-well steel pipe may be a seamless steel pipe or may be a welded steel pipe. The oil country tubular goods are, for example, steel pipes that are used for use in casing or tubing.

The aforementioned steel material may be a seamless steel pipe.

In the case that the steel material according to the present embodiment is a seamless steel pipe, even when the wall thickness thereof is 15 mm or more, the oil-well steel pipe has a yield strength of 655 to 1069 MPa (95 to 140 ksi grade) and excellent SSC resistance.

Hereunder, the steel material according to the present invention is described in detail. The symbol "%" in relation to an element means "mass percent" unless specifically stated otherwise.

[Chemical Composition]

The chemical composition of the steel material according to the present invention contains the following elements.

C: 0.20 to 0.50%

Carbon (C) enhances the hardenability of the steel material and increases the strength of the steel material. C also promotes spheroidization of carbides during tempering in the production process, and increase the SSC resistance of the steel material. When the carbide disperses, the strength of steel is further increased. These effects will not be obtained if the C content is too low. On the other hand, if the C content is too high, the toughness of the steel material will decrease and quench cracking is liable to occur. Therefore, the C content is within the range of 0.20 to 0.50%. A preferable lower limit of the C content is 0.22%, and more preferably is 0.26%. A preferable upper limit of the C content is 0.45%, more preferably is 0.43%, and further preferably is 0.40%.

Si: 0.05 to 0.50%

Silicon (Si) deoxidizes the steel. If the Si content is too low, this effect is not obtained. On the other hand, if the Si content is too high, the SSC resistance of the steel material decreases. Therefore, the Si content is within the range of 0.05 to 0.50%. A preferable lower limit of the Si content is 0.15%, and more preferably is 0.20%. A preferable upper limit of the Si content is 0.45%, and more preferably is 0.40%.

Mn: 0.05 to 1.00%

Manganese (Mn) deoxidizes the steel material. Mn also enhances the hardenability of the steel material. If the Mn content is too low, these effects are not obtained. On the other hand, if the Mn content is too high. Mn segregates at grain boundaries together with impurities such as P and S. In such a case, the SSC resistance of the steel material will decrease. Therefore, the Mn content is within a range of 0.05 to 1.00%. A preferable lower limit of the Mn content is 0.25%, and more preferably is 0.30%. A preferable upper limit of the Mn content is 0.90%, and more preferably is 0.80%.

P: 0.030% or Less

Phosphorous (P) is an impurity. In other words, the P content is more than 0%, P segregates at the grain boundaries and decreases the SSC resistance of the steel material. Therefore, the P content is 0.030% or less. A preferable upper limit of the P content is 0.020%, and more preferably is 0.015%. Preferably, the P content is as low as possible. However, if the P content is excessively reduced, the production cost increases significantly. Therefore, when taking industrial production into consideration, a preferable lower limit of the P content is 0.0001%, more preferably is 0.0002%, and further preferably is 0.0003%.

S: Less than 0.0050%

Sulfur (S) is an impurity. In other words, the S content is more than 0%. S segregates at the grain boundaries and decreases the SSC resistance of the steel material. Therefore, the S content is less than 0.0050%. A preferable upper limit of the S content is 0.0045%, more preferably is 0.0040%, and further preferably is 0.0030%. Preferably, the S content is as low as possible. However, if the S content is excessively reduced, the production cost increases significantly. Therefore, when taking industrial production into consideration, a preferable lower limit of the S content is 0.0001%, more preferably is 0.0002%, and further preferably is 0.0003%.

Al: 0.005 to 0.050%

Aluminum (Al) deoxidizes the steel material. If the Al content is too low, this effect is not obtained and the SSC resistance of the steel material decreases. On the other hand, if the Al content is too high, coarse oxide-based inclusions are formed and the SSC resistance of the steel material decreases. Therefore, the Al content is within a range of 0.005 to 0.050%. A preferable lower limit of the Al content is 0.015%, and more preferably is 0.020%. A preferable upper limit of the Al content is 0.040%, and more preferably is 0.030%. In the present description, the "Al" content means "acid-soluble Al", that is, the content of "sol. Al".

Cr: 0.10 to 1.50%

Chromium (Cr) enhances the hardenability of the steel material. Cr also increases temper softening resistance of the steel material and enables high-temperature tempering. As a result, the SSC resistance of the steel material increases. If the Cr content is too low, these effects are not obtained. On the other hand, if the Cr content is too high, the toughness and SSC resistance of the steel material decreases. Therefore, the Cr content is within a range of 0.10 to 1.50%. A preferable lower limit of the Cr content is 0.25%, and more preferably is 0.30%. A preferable upper limit of the Cr content is 1.30%, and more preferably is 1.20%.

Mo: 0.25 to 1.80%

Molybdenum (Mo) enhances the hardenability of the steel material. Mo also forms fine carbides and increases the temper softening resistance of the steel material. As a result, the SSC resistance of the steel material increases. If the Mo content is too low, these effects are not obtained. On the other hand, if the Mo content is too high, the aforementioned effects are saturated. Therefore, the Mo content is within a range of 0.25 to 1.80%. A preferable lower limit of the Mo content is 0.30%, more preferably is 0.35%, further preferably is 0.40%, and further preferably is 0.50%. A preferable upper limit of the Mo content is 1.50%, more preferably is 1.30%, further preferably is 1.25%, and further preferably is 1.10%.

Ti: 0.002 to 0.050%

Titanium (Ti) forms nitrides, and refines crystal grains by the pinning effect. As a result, the strength of the steel material increases. If the Ti content is too low, the effect is not obtained. On the other hand, if the Ti content is too high, Ti nitrides coarsen and the SSC resistance of the steel material decreases. Therefore, the Ti content is within a range of 0.002 to 0.050%. A preferable lower limit of the Ti content is 0.003%, and more preferably is 0.005%. A preferable upper limit of the Ti content is 0.030%, and more preferably is 0.020%.

Nb: 0.002 to 0.100%

Niobium (Nb) combines with C or N to form carbides, nitrides or carbo-nitrides and the like (hereinafter, referred to as "carbo-nitrides and the like"). These carbo-nitrides and the like refine the substructure of the steel material by the pinning effect, and increase the SSC resistance of the steel material. In addition, because Nb also forms spherical MC-type carbides, Nb suppresses the formation of acicular $M_2C$-type carbides and thereby increases the SSC resistance of the steel material. If the Nb content is too low, these effects cannot be obtained. On the other hand, if the Nb content is too high, the carbo-nitrides and the like are excessively formed and the SSC resistance of the steel material decreases. Therefore, the Nb content is within the range of 0.002 to 0.100%. A preferable lower limit of the Nb content is 0.003%, and more preferably 0.007%. A preferable upper limit of the Nb content is less than 0.050%4, more preferably 0.035%, and further preferably 0.030%.

B: 0.0001 to 0.0050%

Boron (B) dissolves in the steel, enhances the hardenability of the steel material and increases the strength of the steel material. This effect is not obtained if the B content is too low. On the other hand, if the B content is too high, coarse nitrides form in the steel material and the SSC resistance of the steel material decreases. Therefore, the B content is within a range of 0.0001 to 0.0050%. A preferable lower limit of the B content is 0.0003%, and more preferably is 0.0007%. A preferable upper limit of the B content is 0.0035%, and more preferably is 0.0025%.

N: 0.0070% or Less

Nitrogen (N) is unavoidably contained. In other words, the N content is more than 0%, N combines with Ti to form nitrides and thereby refines the crystal grains of the steel material by the pinning effect. However, if the N content is too high, N forms coarse nitrides and the SSC resistance of the steel material decreases. Therefore, the N content is 0.0070% or less. A preferable upper limit of the N content is 0.0050%, and more preferably is 0.0040%. The lower limit of the N content to obtain the aforementioned effects more effectively is 0.0005%, more preferably is 0.0010%, and further preferably is 0.0020%.

O: Less than 0.0050%

Oxygen (O) is an impurity. In other words, the O content is more than 0%. O forms coarse oxides and reduces the corrosion resistance of the steel material. Therefore, the O content is less than 0.0050%. A preferable upper limit of the O content is 0.0030%, and more preferably is 0.0020%. Preferably, the O content is as low as possible. However, if the O content is excessively reduced, the production cost increases significantly. Therefore, when taking industrial production into consideration, a preferable lower limit of the O content is 0.0001%, more preferably is 0.0002%, and further preferably is 0.0003%.

The balance of the chemical composition of the steel material according to the present embodiment is Fe and impurities. Here, the term "impurities" refers to elements which, during industrial production of the steel material, are mixed in from ore or scrap that is used as a raw material of the steel material, or from the production environment or the like, and which are allowed within a range that does not adversely affect the steel material according to the present embodiment.

[Regarding Optional Elements]

The chemical composition of the steel material described above may further contain V in lieu of a part of Fe.

V: 0 to 0.30%

Vanadium (V) is an optional element, and need not be contained. In other words, the V content may be 0%. If contained, V forms carbo-nitrides and the like. These carbo-nitrides and the like refine the substructure of the steel material by the pinning effect, and improve the SSC resistance of the steel. V also forms fine carbides during tempering. The fine carbides increase the temper softening resistance of the steel material, and increase the strength of the steel material. In addition, because V also forms spherical MC-type carbides, V suppresses the formation of acicular $M_2C$-type carbides and thereby increases the SSC resistance of the steel material. If even a small amount of V is contained, these effects are obtained to a certain extent. However, if the V content is too high, the toughness of the steel material decreases. Therefore, the V content is within the range of 0 to 0.30%. A preferable lower limit of the V content is more than 0%, more preferably is 0.01%, and further preferably is 0.02%, Ina case where it is intended to obtain a yield strength of 965 MPa or more, it is preferable that the steel material contains V in an amount of 0.01% or more. When V is contained in an amount of 0.01% or more, the yield strength of the steel material is stably made 965 MPa or more. Therefore, in a case where the yield strength is within a range of 965 to 1069 MNP, a preferable lower limit of the V content is 0.01%, more preferably is 0.02%, further preferably is 0.04%, and further preferably is 0.05%. A preferable upper limit of the V content is 0.20%, more preferably is 0.15%, and further preferably 0.12%.

The chemical composition of the steel material described above may further contain one or more types of element selected from the group consisting of Ca, Mg, Zr and rare earth metal (REM) in lieu of a part of Fe. Each of these elements is an optional element, and increases the SSC resistance of the steel material.

Ca: 0 to 0.0100%

Calcium (Ca) is an optional element, and need not be contained. In other words, the Ca content may be 0%. If contained, Ca renders S in the steel material harmless by forming sulfides, and thereby increases the SSC resistance of the steel material. If even a small amount of Ca is contained, this effect is obtained to a certain extent. However, if the Ca content is too high, oxides in the steel material coarsen and the SSC resistance of the steel material decreases. Therefore, the Ca content is within the range of 0 to 0.0100%. A preferable lower limit of the Ca content is more than 0%, more preferably is 0.0001%, further preferably is 0.0003%, further preferably is 0.0006%, and further preferably is 0.0010%. A preferable upper limit of the Ca content is 0.0025%, and more preferably is 0.0020%.

Mg: 0 to 0.0100%

Magnesium (Mg) is an optional element, and need not be contained. In other words, the Mg content may be 0%. If contained, Mg renders S in the steel material harmless by forming sulfides, and thereby increases the SSC resistance of the steel material. If even a small amount of Mg is contained, this effect is obtained to a certain extent. However, if the Mg content is too high, oxides in the steel material coarsen and decrease the SSC resistance of the steel material. Therefore, the Mg content is within the range of 0 to 0.0100%. A preferable lower limit of the Mg content is more than 0%, more preferably is 0.0001%, further preferably is 0.0003%, further preferably is 0.0006%, and further preferably is 0.0010%. A preferable upper limit of the Mg content is 0.0025%, and more preferably is 0.0020%.

Zr: 0 to 0.0100%

Zirconium (Zr) is an optional element, and need not be contained. In other words, the Zr content may be 0%. If contained, Zr renders S in the steel material harmless by forming sulfides, and thereby increases the SSC resistance of the steel material. If even a small amount of Zr is contained, this effect is obtained to a certain extent. However, if the Zr content is too high, oxides in the steel material coarsen and the SSC resistance of the steel material decreases. Therefore, the Zr content is within the range of 0 to 0.0100%. A preferable lower limit of the Zr content is more than 0%, more preferably is 0.0001%, further preferably is 0.0003%, further preferably is 0.0006%, and further preferably is 0.0010%. A preferable upper limit of the Zr content is 0.0025%, and more preferably is 0.0020%.

Rare Earth Metal (REM): 0 to 0.0100%

Rare earth metal (REM) is an optional element, and need not be contained. In other words, the REM content may be 0%. If contained, REM renders S in the steel material harmless by forming sulfides, and thereby increases the SSC resistance of the steel material. REM also combines with P in the steel material and suppresses segregation of P at the grain boundaries. Therefore, a decrease in the SSC resistance of the steel material that is attributable to segregation of P is suppressed. If even a small amount of REM is contained, these effects are obtained to a certain extent. However, if the REM content is too high, oxides in the steel material coarsen and SSC resistance of the steel material decreases. Therefore, the REM content is within the range of 0 to 0.0100%. A preferable lower limit of the REM content is more than 0%, more preferably is 0.0001%, further preferably is 0.0003%, further preferably is 0.0006%, and further preferably is 0.0010%. A preferable upper limit of the REM content is 0.0025%, and more preferably is 0.0020%.

Note that, in the present description the term "REM" refers to one or more types of element selected from a group consisting of scandium (Sc) which is the element with atomic number 21, yttrium (Y) which is the element with atomic number 39, and the elements from lanthanum (La) with atomic number 57 to lutetium (Lu) with atomic number 71 that are lanthanoids. Further, in the present description the term "REM content" refers to the total content of these elements.

In a case where two or more types of element selected from the aforementioned group containing Ca, Mg, Zr, and REM are contained in combination, the total amount of these elements is preferably 0.0100% or less, and more preferably is 0.0050% or less.

The chemical composition of the steel material described above may further contain one or more types of element selected from the group consisting of Co and W in lieu of a part of Fe. Each of these elements is an optional element that forms a protective corrosion coating in a sour environment and suppresses penetration of hydrogen into the steel material. By this means, each of these elements increases the SSC resistance of the steel material.

Co: 0 to 1.50%

Cobalt (Co) is an optional element, and need not be contained. In other words, the Co content may be 0%. If contained, Co forms a protective corrosion coating in a sour environment and suppresses penetration of hydrogen into the steel material. By this means, Co increases the SSC resistance of the steel material. If even a small amount of Co is contained, this effect is obtained to a certain extent. However, if the Co content is too high, the hardenability of the steel material will decrease, and the steel material strength will decrease. Therefore, the Co content is within the range of 0 to 1.50%. A preferable lower limit of the Co content is more than 0%, more preferably is 0.02%, and further preferably is 0.05%. A preferable upper limit of the Co content is 1.25%, more preferably is 1.00%, further preferably is 0.80%, further preferably is 0.60%, and further preferably is 0.50%.

W: 0 to 1.50%

Tungsten (W) is an optional element, and need not be contained. In other words, the W content may be 0%. If contained, W forms a protective corrosion coating in a sour environment and suppresses penetration of hydrogen into the steel material. By this means, W increases the SSC resistance of the steel material. If even a small amount of W is contained, this effect is obtained to a certain extent. However, if the W content is too high, coarse carbides form in the steel material and the SSC resistance of the steel material decreases. Therefore, the W content is within the range of 0 to 1.50%. A preferable lower limit of the W content is more than 0%, more preferably is 0.02%, and further preferably is 0.05%. A preferable upper limit of the W content is 1.25%, more preferably is 1.00%, further preferably is 0.80%, further preferably is 0.60%, and further preferably is 0.50%.

The chemical composition of the steel material described above may further contain one or more types of element selected from the group consisting of Ni and Cu in lieu of a part of Fe. Each of these elements is an optional element, and increases the hardenability of the steel material.

Ni: 0 to 0.50%

Nickel (Ni) is an optional element, and need not be contained. In other words, the Ni content may be 0%. If contained, Ni enhances the hardenability of the steel material and increases the steel material strength. If even a small amount of Ni is contained, this effect is obtained to a certain extent. However, if the Ni content is too high, the Ni will promote local corrosion, and the SSC resistance of the steel material will decrease. Therefore, the Ni content is within the range of 0 to 0.50%. A preferable lower limit of the Ni content is more than 0%, and more preferably is 0.02%. A preferable upper limit of the Ni content is 0.35%, and more preferably is 0.25%.

Cu: 0 to 0.50%

Copper (Cu) is an optional element, and need not be contained. In other words, the Cu content may be 0%. If contained, Cu enhances the hardenability of the steel material and increases the steel material strength. If even a small amount of Cu is contained, this effect is obtained to a certain extent. However, if the Cu content is too high, the hardenability of the steel material will be too high, and the SSC resistance of the steel material will decrease. Therefore, the Cu content is within the range of 0 to 0.50%. A preferable lower limit of the Cu content is more than 0%, and more preferably is 0.02%. A preferable upper limit of the Cu content is 0.35%, and more preferably is 0.25%.

[Kam Value]

In a case where the steel material according to the present embodiment has a yield strength of 655 to less than 862 MPa (95 ksi grade and 110 ksi grade), the proportion of KAM values of 1° or less is 40 area % or more. Further, in a case where the steel material according to the present embodiment has a yield strength of 862 to less than 965 MPa (125 ksi grade), the proportion of KAM values of 1° or less is 35 area % or more. Further, in a case where the steel material according to the present embodiment has a yield strength of 965 to 1069 MPa (140 ksi grade), the proportion of KAM values of 1° or less is 30 area % or more.

As described above, the KAM value is an index representing a deviation of a crystal orientation from surroundings in the microstructure of the steel material. At a measurement point having a large KAM value, differences in the crystal orientation between the surroundings and the measurement point are large. In this case, at the measurement point, microscopic strain in a crystal is locally large. In contrast, at a measurement point having a small KAM value, differences in the crystal orientation between the surroundings and the measurement point are small. In this case, at the measurement point, the microscopic strain in the crystal is reduced.

With the KAM map created based on the KAM value, a distribution of the microscopic strain in a crystal of the microstructure of the steel material can be visualized. Therefore, in the steel material according to the present embodiment, the proportion of KAM values of 1° or less that is visualized by the KAM map is increased. As a result, the steel material according to the present embodiment can increase the SSC resistance.

That is, a distribution of the microscopic strain in a crystal is used as an index rather than the average value of the microscopic strain in a crystal as typified by the dislocation density that has been conventionally used. The field used to create the KAM map for determining the proportion of KAM values of 1° or less, which is the index of the distribution of the microscopic strain in a crystal, is not particularly limited, but is, for example, 100 μm×100 μm. The KAM map created within the field to some extent correlates with the distribution of the microscopic strain in a crystal with high accuracy.

In summary, the proportion of areas having KAM values of 1° or less of the steel material according to the present embodiment is not simply compared with the dislocation density. For example, there can be a case where the proportion of areas having KAM values of 1 or less is low whereas the dislocation density is high. On the other hand, there can be a case where the proportion of areas having KAM values of 1° or less is high whereas the dislocation density is low.

As described above, the proportion of KAM values 1° or less is an index representing the microscopic strain in the microstructure of the steel material. If the proportion of KAM values 1° or less is too low, the microscopic strain is not sufficiently reduced in the microstructure of the steel material. As a result, the steel material does not exert excellent SSC resistance. Therefore, for the steel material according to the present embodiment, the proportion of KAM values of 1° or less is increased for each yield strength that is intended to obtain.

In a case where the yield strength is within the range of 655 to less than 862 MPa (95 ksi grade and 110 ksi grade), the proportion of KAM values of 1° or less is 40 area % or more. In this case, a preferable lower limit of the proportion of KAM values of 1 or less is 45 area %, more preferably is 47 area %, further preferably is 50 area %, and further preferably is 53 area %.

In a case where the yield strength is within the range of 862 to less than 965 MPa (125 ksi grade), the proportion of KAM values of 1° or less is 35 area % or more. In this case, a preferable lower limit of the proportion of KAM values of 1 or less is 37 area %, more preferably is 40 area %, further preferably is 42 area %, and further preferably is 45 area %.

In a case where the yield strength is within the range of 965 to 1069 MPa (140 ksi grade), the proportion of KAM values of 1 or less is 30 area % or more. In this case, a preferable lower limit of the proportion of KAM values of 1 or less is 32 area %, more preferably is 35 area %, further preferably is 37 area %, and further preferably is 40 area %.

Note that, preferably, the proportion of KAM values of 1 or less is as high as possible. That is, an upper limit of the proportion of KAM values of 1° or less is not particularly limited. In short, the proportion of KAM values of 1° or less may be 100 area %.

However, in the EBSD method according to the present embodiment, a region surrounded by orientation differences from adjacent crystals of 5° or more is recognized as a crystal grain. Therefore, near crystal grain boundaries, the KAM value is liable to become large. Note that, in the steel material according to the present embodiment that is assumed to be used in a sour environment, crystal grain boundaries are observed in an observation field across an observation field area in a measuring method that is described later. Therefore, in the steel material according to the present embodiment, the upper limit of the proportion of KAM values of 1 or less is substantially less than 100 area %.

The KAM value of the steel material according to the present embodiment can be determined by the following method. A test specimen for use for KAM value measurement is taken from the steel material according to the present embodiment. In a case where the steel material is a steel plate, a test specimen is taken from a center portion of the thickness. In a case where the steel material is a steel pipe, a test specimen is taken from a center portion of the wall thickness. The size of the test specimen is not particularly limited as long as the test specimen has an observation surface of 100 μm×100 μm centering on the center portion of the plate thickness or the center portion of the wall thickness.

Mirror polish is performed on the aforementioned observation surface, and the surface is finished. On a test specimen whose surface is finished, the EBSD measurement is performed in afield of 100 μm×100 μm at 0.3 μm pitch. In the EBSD measurement, an accelerating voltage is set to 20 kV. From the determined EBSD measurement value, the KAM value is determined.

The KAM value is defined as above. Specifically, afield of 100 μm×100 μm is divided on a basis of a regular hexagon pixel. One of the sides of the pixel is 0.15 μm long. A given regular hexagon pixel is selected as a center pixel. With respect to the selected center pixel and six pixels that are so disposed as to be adjacent to the outside of the center pixel, orientation differences between pixels are determined. The average value of the obtained orientation differences is determined, and the average value is defined as the KAM value of the center pixel. The same method is used for every pixel within the field of 100 μm×100 μm, and the KAM value is determined.

After the KAM value of each pixel in the observation field is calculated, a KAM map representing the KAM value of each pixel is created. In the obtained KAM map, KAM values of all pixels are summarized. Among the KAM values of all pixels, the proportion of KAM values of 1° or less is determined. The proportion is defined as a proportion of KAM values of 1° or less (area %).

As an EBSD analysis program for determining the KAM value, a well-known program can be used. For example, OIM Data Collection/Analysis 6.2.0 manufactured by TSL solutions Ltd can be used.

[Microstructure]

The microstructure of the steel material according to the present embodiment is principally composed of tempered martensite and tempered bainite. More specifically, the volume ratio of tempered martensite and/or tempered bainite in the microstructure is 95% or more. In other words, the total of the volume ratios of tempered martensite and tempered bainite in the microstructure is 95% or more. The balance of the microstructure is, for example, ferrite or pearlite.

If the microstructure of the steel material containing the aforementioned chemical composition contains tempered martensite and tempered bainite in an amount equivalent to a total volume ratio of 95% or more, the yield strength will be in the range of 655 to 1069 MPa (95 to 140 ksi grade), and the yield ratio will be 85% or more.

In the present embodiment, if the yield strength is in the range of 655 to 1069 MPa (95 to 140 ksi grade), and the yield ratio is 85% or more, the microstructure is supposed to contain tempered martensite and tempered bainite in an amount equivalent to 95% or more. Preferably, the microstructure is composed of only tempered martensite and/or tempered bainite. In other words, the total volume ratio of tempered martensite and tempered bainite in the microstructure may be 100%.

Note that in a case where the total of the volume ratios of tempered martensite and tempered bainite is determined by observation, the total can be determined by the following method. In a case where the steel material is a steel plate, a test specimen having an observation surface with dimensions of 10 mm in the rolling direction and 10 mm in the thickness direction is cut out from a center portion of the thickness. In a case where the steel material is a steel pipe, a test specimen having an observation surface with dimensions of 10 mm in the pipe axis direction and 10 nm in the wall thickness direction is cut out from a center portion of the wall thickness.

After polishing the observation surface of the test specimen to obtain a mirror surface, the test specimen is immersed for about 10 seconds in a nital etching reagent, to reveal the microstructure by etching. The etched observation surface is observed by performing observation with respect to 10 visual fields by means of a secondary electron image obtained using a scanning electron microscope (SEM). The visual field area is 400 μm$^2$ (magnification of ×5000).

Tempered martensite and tempered bainite are identified based on contrast in each visual field. The totals of the area fractions of the identified tempered martensite and tempered bainite are determined. In the present embodiment, the arithmetic average value of the totals of the area fractions of tempered martensite and tempered bainite determined in all of the visual fields is defined as the volume ratio (%) of tempered martensite and tempered bainite.

[Shape of Steel Material]

The shape of the steel material according to the present embodiment is not particularly limited. The steel material is, for example, a steel pipe or a steel plate. In a case where the steel material is an oil-well steel pipe, the steel material is preferably a seamless steel pipe. In addition, in a case where the steel material is an oil-well steel pipe, the wall thickness is not particularly limited and is, for example, within a range of 9 to 60 mm. The steel material according to the present embodiment is suitable for use as a heavy-wall seamless steel pipe. More specifically, even if the steel material according to the present invention is a seamless steel pipe having a heavy wall with a thickness of 15 mm or more or, furthermore, 20 mm or more, a yield strength in a range of 95 to 140 ksi grade and excellent SSC resistance can both be obtained.

[Yield Strength and Yield Ration of Steel Material]

The steel material according to the present embodiment has a yield strength within the range of 655 to 1069 MPa (95 to 140 ksi grade) and a yield ratio of 85% or more. In short, the steel material according to the present embodiment has a yield strength of any one of 95 ksi grade, 110 ksi grade, 125 ksi grade, and 140 ksi grade, and a yield ratio of 85% or more.

The yield strength of the steel material according to the present embodiment is defined in accordance with API 5CT (2011). Specifically, the yield strength of the steel material according to the present embodiment is defined for each range of yield strength. More specifically, in a case where the steel material according to the present embodiment has a yield strength within a range of 655 to less than 758 MPa (95 ksi grade), the yield strength means a stress that is obtained in a tensile test at a time of 0.5% elongation (0.5% proof stress). In a case where the steel material according to the present embodiment has a yield strength within a range of 758 to less than 862 MPa (110 ksi grade), the yield strength means a stress that is obtained in a tensile test at a time of 0.7% elongation (0.7% proof stress).

In a case where the steel material according to the present embodiment has a yield strength within a range of 862 to less than 965 MPa (125 ksi grade), the yield strength means a stress that is obtained in a tensile test at a time of 0.65% elongation (0.65% proof stress). In a case where the steel material according to the present embodiment has a yield strength within a range of 965 to 1069 MPa (140 ksi grade), the yield strength means a stress that is obtained in a tensile test at a time of 0.65% elongation (0.65% proof stress).

Even the steel material according to the present embodiment is adjusted to have a yield strength of 655 to 1069 MPa (95 to 140 ksi grade), the steel material has excellent SSC resistance by satisfying the aforementioned chemical composition the proportion of KAM values of 1° or less, and the microstructure. Note that the yield ratio (YR) is a ratio of a yield strength (YS) to a tensile strength (TS)(YR=YS/TS).

The yield strength and the yield ratio of the steel material according to the present embodiment can be determined by the following method. Specifically, a tensile test is performed in accordance with ASTM E8 (2013). A round bar test specimen is taken from the steel material according to the present embodiment. In a case where the steel material is a steel plate, the round bar test specimen is taken from the center portion of the thickness. In a case where the steel material is a steel pipe, the round bar test specimen is taken from the center portion of the wall thickness.

Regarding the size of the round bar test specimen, for example, the round bar test specimen has a parallel portion diameter of 8.9 mm and a parallel portion length of 35.6 mm. Note that the axial direction of the round bar test specimen is parallel to the rolling direction of the steel material. Using the round bar specimen, the tensile test is performed in the atmosphere at normal temperature (25° C.).

In a case where the obtained stress at the time of 0.5% elongation (0.5% proof stress) is within the range of 655 to less than 758 MPa (95 ksi grade), the 0.5% proof stress is defined as the yield strength. In a case where the obtained stress at the time of 0.7% elongation (0.7% proof stress) is within the range of 758 to less than 862 MPa (110 ksi grade), the 0.7% proof stress is defined as the yield strength. Ina case where the obtained stress at the time of 0.65 elongation (0.65% proof stress) is within the range of 862 to 1069 MPa (125 ksi grade or 140 ksi grade), the 0.65% proof stress is defined as the yield strength.

In addition, a maximum stress in a uniform elongation is defined as the tensile strength (MPa). The yield ratio (YR) (%) can be determined as the ratio of a yield strength (YS) to a tensile strength (TS)(YR=YS/TS).

[SSC Resistance of Steel Material]

As described above, there is a possibility that dislocations in the steel material will occlude hydrogen. Therefore, it has been thought that the SSC resistance of the steel material decreases as the yield strength of the steel material increases. Therefore, also in the present embodiment, excellent SSC resistance is defined for each grade of yield strength. Specifically, the excellent SSC resistance is defined as follows.

[SSC Resistance when Yield Strength is 95 Ksi Grade]

In a case where the yield strength of the steel material is of 95 ksi grade, the SSC resistance of the steel material can be evaluated by means of a method in accordance with a four-point bending test. Hereunder, excellent SSC resistance in a case where the yield strength of the steel material is of 95 ksi grade is described in detail.

Test specimens are taken from the steel material according to the present embodiment. In a case where the steel material is a steel plate, the test specimens are taken from a center portion of the thickness. In a case where the steel material is a steel pipe, the test specimens are taken from a center portion of the wall thickness. The size of the test specimen is, for example, 2 mm in thickness, 10 mm in width and 75 mm in length. The longitudinal direction of the test specimen is parallel to the rolling direction of the steel material.

An aqueous solution containing 5.0 mass % of sodium chloride is employed as the test solution. In accordance with ASTM G39-99 (2011), stress is applied to the test specimens by four-point bending so that the stress applied to each test specimen becomes 95% of the actual yield stress.

The test specimens to which stress has been applied are enclosed in an autoclave, together with the test jig. The test solution is poured into the autoclave in a manner so as to leave a vapor phase portion, and adopted as the test bath. After the test bath is degassed, 15 atm $H_2S$ gas is sealed under pressure in the autoclave and the test bath is stirred to cause the $H_2S$ gas to saturate. After sealing the autoclave, the test bath is stirred at 24° C.

If the steel material according to the present embodiment has a yield strength of 95 ksi grade, if cracking is not confirmed after 720 hours (30 days) elapses in the four-point bending test described above, it is determined that the steel material has excellent SSC resistance. Note that, in the present description, the term "cracking is not confirmed" means that cracking is not confirmed in a test specimen in a case where the test specimen after the test was observed by the naked eye.

[SSC Resistance when Yield Strength is 110 Ksi Grade]

In a case where the yield strength of the steel material is of 110 ksi grade, the SSC resistance of the steel material can be evaluated by means of the four-point bending test. Hereunder, excellent SSC resistance in a case where the yield strength of the steel material is of 110 ksi grade is described in detail.

Test specimens are taken from the steel material according to the present embodiment. In a case where the steel material is a steel plate, a test specimen is taken from a center portion of the thickness. In a case where the steel material is a steel pipe, a test specimen is taken from a center portion of the wall thickness. The size of the test specimen is, for example, 2 mm in thickness, 10 mm in width and 75 mm in length. The longitudinal direction of the test specimen is parallel to the rolling direction of the steel material.

An aqueous solution containing 5.0 mass % of sodium chloride is employed as the test solution. In accordance with ASTM G39-99 (2011), stress is applied to the test specimens by four-point bending so that the stress applied to each test specimen becomes 90% of the actual yield stress.

The test specimens to which stress has been applied are enclosed in an autoclave, together with the test jig. The test solution is poured into the autoclave in a manner so as to leave a vapor phase portion, and adopted as the test bath. After the test bath is degassed, 15 atm $H_2S$ gas is sealed under pressure in the autoclave, and the test bath is stirred to cause the $H_2S$ gas to saturate. After sealing the autoclave, the test bath is stirred at 24° C.

If the steel material according to the present embodiment has a yield strength of 110 ksi grade, if cracking is not confirmed after 720 hours (30 days) elapses in the four-point bending test described above, it is determined that the steel material has excellent SSC resistance. Note that, in the present description, the term "cracking is not confirmed"

means that cracking is not confirmed in a test specimen in a case where the test specimen after the test was observed by the naked eye.

[SSC Resistance when Yield Strength is 125 Ksi Grade]

In a case where the yield strength of the steel material is of 125 ksi grade, the SSC resistance of the steel material can be evaluated by means of the DCB test in accordance with "Method D" specified in NACE TM0177-2005. Hereunder, the excellent SSC resistance in a case where the yield strength of the steel material is 125 ksi grade is described in detail.

A DCB test specimen illustrated in FIG. 1A is taken from the steel material according to the present embodiment. In a case where the steel material is a steel plate, the DCB test specimen is taken from a center portion of the thickness. In a case where the steel material is a steel pipe, the DCB test specimen is taken from a center portion of the wall thickness. A longitudinal direction of the DCB test specimen is parallel to the rolling direction of the steel material.

Figure 1B:
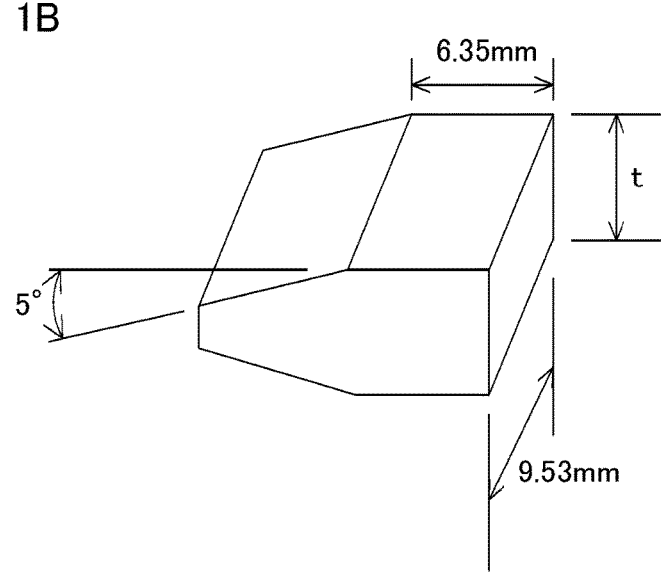
FIG. 1B is a perspective view of a wedge used in the DCB test in the embodiment.

In addition, a wedge illustrated in FIG. 1B is taken from the steel material according to the present embodiment. The thickness t of the wedge is made 2.82 (mm). Referring to FIG. 1A, the aforementioned wedge is driven between arms of the DCB test specimen. The DCB test specimen with the wedge driven is enclosed in a test vessel.

A mixed aqueous solution containing 5.0 mass % of sodium chloride and 0.4 mass % of sodium acetate that is adjusted to pH 3.5 using acetic acid (NACE solution B) is employed as the test solution. The test solution is poured into the test vessel with the DCB test specimen enclosed in a manner so as to leave a vapor phase portion, and is adopted as a test bath.

After the test bath is degassed, a gaseous mixture of 0.03 atm $H_2S$ and 0.97 atm $CO_2$ is blown into the test vessel to make the test bath a corrosive environment. The inside of the test vessel is held at a temperature of 4° C. for 408 hours (17 days) while stirring the test bath. After being held, the DCB test specimen is taken out from the test vessel.

A Pin is inserted into a hole formed in the tip of the arm of each DCB test specimen that is taken out and a notch portion is opened with a tensile test machine, and a wedge releasing stress P is measured. In addition, the notch in the DCB test specimen is released in liquid nitrogen, and a crack propagation length "a" of with respect to crack propagation that occurred during immersion is measured. The crack propagation length "a" can be measured by visually using vernier calipers. A fracture toughness value $K_{1SSC}$ (MPa√m) is determined using Formula (1) based on the obtained wedge releasing stress P and the crack propagation length "a".

$$K_{1SSC} = \frac{Pa\left(2\sqrt{3} + 2.38\frac{h}{a}\right)\left(\frac{B}{Bn}\right)^{\frac{1}{\sqrt{3}}}}{Bh^{\frac{3}{2}}} \quad (1)$$

In Formula (1), h represents the height (mm) of each arm of the DCB test specimen, B represents the thickness (mm) of the DCB test specimen, and Bn represents the web thickness (mm) of the DCB test specimen. These are defined in "Method D" of NACE TM0177-2005.

If the steel material according to the present embodiment has a yield strength of 125 ksi grade, if the fracture toughness value $K_{1SSC}$ determined in the aforementioned DCB test is 15 MPa√m or more, it is determined that the steel material has excellent SSC resistance.

[SSC Resistance when Yield Strength is 140 Ksi Grade]

In a case where the yield strength of the steel material is of 140 ksi grade, the SSC resistance of the steel material can be evaluated by means of the DCB test in accordance with "Method D" specified in NACE TM177-2005. Hereunder, the excellent SSC resistance in a case where the yield strength of the steel material is 140 ksi grade is described in detail.

A DCB test specimen illustrated in FIG. 1A is taken from the steel material according to the present embodiment. In a case where the steel material is a steel plate, the DCB test specimen is taken from a center portion of the thickness. In a case where the steel material is a steel pipe, the DCB test specimen is taken from a center portion of the wall thickness. A longitudinal direction of the DCB test specimen is parallel to the rolling direction of the steel material.

In addition, a wedge illustrated in FIG. 1B is taken from the steel material according to the present embodiment. The thickness t of the wedge is made 3.13 (mm). Referring to FIG. 1A, the aforementioned wedge is driven between anus of the DCB test specimen. The DCB test specimen with the wedge driven is enclosed in a test vessel.

A mixed aqueous solution containing 5.0 mass % of sodium chloride and 0.4 mass % of sodium acetate that is adjusted to pH 4.0 using acetic acid is employed as the test solution. The test solution is poured into the test vessel with the DCB test specimen enclosed in a manner so as to leave a vapor phase portion, and adopted as a test bath.

After the test bath is degassed, a gaseous mixture of 0.003 atm $H_2S$ and 0.997 atm $CO_2$ is blown into the test vessel to make the test bath a corrosive environment. The inside of the test vessel is held at a temperature of 4° C. for 408 hours (17 days) while stirring the test bath. After being held, the DCB test specimen is taken out from the test vessel.

A Pin is inserted into a hole formed in the tip of the arm of each DCB test specimen that is taken out and a notch portion is opened with a tensile test machine, and a wedge releasing stress P is measured. In addition, the notch in the DCB test specimen is released in liquid nitrogen, and a crack propagation length "a" of with respect to crack propagation that occurred during immersion is measured. The crack propagation length "a" can be measured by visually using vernier calipers. A fracture toughness value $K_{1SSC}$ (MPa√m) is determined using Formula (1) based on the obtained wedge releasing stress P and the crack propagation length "a".

$$K_{1SSC} = \frac{Pa\left(2\sqrt{3} + 2.38\frac{h}{a}\right)\left(\frac{B}{Bn}\right)^{\frac{1}{\sqrt{3}}}}{Bh^{\frac{3}{2}}} \quad (1)$$

In Formula (1), h represents the height (mm) of each arm of the DCB test specimen, B represents the thickness (mm) of the DCB test specimen, and Bn represents the web thickness (mm) of the DCB test specimen. These are defined in "Method D" of NACE TM0177-2005.

If the steel material according to the present embodiment has a yield strength of 140 ksi grade, if the fracture toughness value $K_{1SSC}$ determined in the aforementioned DCB test is 24 MPa√m or more, it is determined that the steel material has excellent SSC resistance.

[Production Method]

A method for producing the steel material according to the present embodiment will now be described. The production method described hereunder is a method for producing a seamless steel pipe as one example of the steel material according to the present embodiment. The method for producing a seamless steel pipe includes a process of preparing a hollow shell (preparation process), a process of subjecting the hollow shell to quenching and tempering (quenching process and tempering process), a hot straightening process, a hollow shell temperature adjustment process, and a rapid cooling process. Note that, a production method according to the present embodiment is not limited to the production method described hereunder.

[Preparation Process]

In the preparation process, an intermediate steel material containing the aforementioned chemical composition is prepared. The method for producing the intermediate steel material is not particularly limited as long as the intermediate steel material contains the aforementioned chemical composition. As used here, the term "intermediate steel material" refers to a plate-shaped steel material in a case where the end product is a steel plate, and refers to a hollow shell in a case where the end product is a steel pipe.

The preparation process may include a process in which a starting material is prepared (starting material preparation process), and a process in which the starting material is subjected to hot working to produce an intermediate steel material (hot working process). Hereunder, a case in which the preparation process includes the starting material preparation process and the hot working process is described in detail.

[Starting Material Preparation Process]

In the starting material preparation process, a starting material is produced using molten steel containing the aforementioned chemical composition. The method for producing the starting material is not particularly limited, and a well-known method can be used. Specifically, a cast piece (a slab, bloom or billet) is produced by a continuous casting process using the molten steel. An ingot may also be produced by an ingot-making process using the molten steel. As necessary, the slab, bloom or ingot may be subjected to blooming to produce a billet. The starting material (a slab, bloom or billet) is produced by the above described process.

[Hot Working Process]

In the hot working process, the starting material that was prepared is subjected to hot working to produce an intermediate steel material. In a case where the steel material is a seamless steel pipe, the intermediate steel material corresponds to a hollow shell. First, the billet is heated in a heating furnace. Although the heating temperature is not particularly limited, for example, the heating temperature is within a range of 1100 to 1300° C. The billet that is extracted from the heating furnace is subjected to hot working to produce a hollow shell (seamless steel pipe). The method of performing the hot working is not particularly limited, and a well-known method can be used.

For example, the Mannesmann process may be performed as the hot working to produce the hollow shell. In this case, a round billet is piercing-rolled using a piercing machine. When performing piercing-rolling, although the piercing ratio is not particularly limited, the piercing ratio is, for example, within a range of 1.0 to 4.0. The round billet that underwent piercing-rolling is further hot-rolled to form a hollow shell using a mandrel mill, a reducer, a sizing mill or the like. The cumulative reduction of area in the hot working process is, for example, 20 to 70%.

A hollow shell may also be produced from the billet by another hot working method. For example, in the case of a heavy-wall steel material of a short length such as a coupling, a hollow shell may be produced by forging by the Ehrhardt process or the like. A hollow shell is produced by the above process. Although not particularly limited, the wall thickness of the hollow shell is, for example, 9 to 60 mm.

The hollow shell produced by hot working may be air-cooled (as-rolled). The hollow shell produced by hot working may be subjected to direct quenching after hot working without being cooled to normal temperature, or may be subjected to quenching after undergoing supplementary heating (reheating) after hot working.

In a case where direct quenching is performed after the hot working, or quenching is performed after supplementary heating, the cooling may be stopped or gentle cooling is performed in the middle of quenching. In this case, the occurrence of quench cracking in a hollow shell can be suppressed. Further, in a case where the direct quenching is performed after the hot working, or quenching is performed after the supplementary heating, a stress relief treatment (SR treatment) may be performed at a time that is after quenching and before the heat treatment of the next process. In this case, residual stress in the hollow shell is eliminated.

As described above, an intermediate steel material is prepared in the preparation process. The intermediate steel material may be produced by the aforementioned preferable process, or may be an intermediate steel material that was produced by a third party, or an intermediate steel material that was produced in another factory other than the factory in which a quenching process and a tempering process that are described later are performed, or at a different works. The quenching process is described in detail hereunder.

[Quenching Process]

In the quenching process, the intermediate steel material that was prepared is subjected to quenching. In the present description, the term "quenching" means rapidly cooling the intermediate steel material that is at a temperature not less than the $A_3$ point. A preferable quenching temperature is 850 to 1000° C. If the quenching temperature is too high, in some cases prior-$\gamma$ grains become coarse and the SSC resistance of the steel material decreases. Therefore, a quenching temperature in the range of 850 to 1000° C. is preferable.

In a case where direct quenching is performed after hot working, the quenching temperature here corresponds to the surface temperature of the intermediate steel material that is measured by a thermometer placed on the exit side of the apparatus that performs the final hot working. Further, in a case where quenching is performed after heating or the supplementary heating after the hot working, the quenching temperature corresponds to the temperature of a furnace in which the supplementary heating is performed.

The quenching method, for example, continuously cools the intermediate steel material (hollow shell) from the quenching starting temperature, and continuously decreases the temperature of the hollow shell. The method of performing the continuous cooling treatment is not particularly limited, and a well-known method can be used. The method of performing the continuous cooling treatment is, for example, a method that cools the hollow shell by immersing the hollow shell in a water bath, or a method that cools the hollow shell in an accelerated manner by shower water cooling or mist cooling.

If the cooling rate during quenching is too slow, in some cases the microstructure does not become one that is principally composed of martensite and bainite. In this case, for the steel material after the tempering process that is described later, the mechanical properties defined in the present embodiment (that is, a yield strength within a range of 95 to 140 ksi grade and a yield ratio of 85% or more) cannot be obtained.

Therefore, in the method for producing the steel material according to the present embodiment, the intermediate steel material (hollow shell) is rapidly cooled during quenching. Specifically, in the quenching process, the average cooling rate when the temperature of the intermediate steel material (hollow shell) is within the range of 800 to 500° C. is defined as a cooling rate during quenching $CR_{800-500}$.

In the quenching process according to the present embodiment, a preferable cooling rate during quenching $CR_{800-500}$ is 300° C./min or more. A more preferable lower limit of the cooling rate during quenching $CR_{800-500}$ is 450° C./min, and further preferably is 600° C./min. An upper limit of the cooling rate during quenching $CR_{800-500}$ is not particularly limited but is, for example, 60000° C./min.

Note that the cooling rate during quenching $CR_{800-500}$ can be determined based on a temperature that is measured at a region that is most slowly cooled within a cross-section of the intermediate steel material that is being quenched (for example, in the case of forcedly cooling both surfaces, the cooling rate is measured at the center portion of the thickness of the intermediate steel material).

Preferably, quenching is performed after performing heating of the hollow shell in the austenite zone a plurality of times. In this case, the SSC resistance of the steel material increases because austenite grains are refined prior to quenching. Heating in the austenite zone may be repeated a plurality of times by performing quenching a plurality of times, or heating in the austenite zone may be repeated a plurality of times by performing normalizing and quenching. Quenching and tempering that is described later may be performed in combination a plurality of times. Therefore, both quenching and tempering may be performed a plurality of times. In this case, the SSC resistance further increases. Hereunder, the tempering process is described below in detail.

[Tempering Process]

The tempering process is carried out by performing tempering after performing the aforementioned quenching. In the present description, the term "tempering" means reheating the intermediate steel material after quenching to a temperature that is no more than the Ai point and holding the intermediate steel material at that temperature. The tempering temperature is appropriately adjusted in accordance with the chemical composition of the steel material and the yield strength, which is to be obtained. Here, the tempering temperature corresponds to the temperature of the furnace when the intermediate steel material after quenching is heated and held at the relevant temperature.

That is, in the tempering process according to the present embodiment, with respect to the intermediate steel material (hollow shell) containing the aforementioned chemical composition, the tempering temperature is adjusted so as to adjust the yield strength of the steel material to within the range of 655 to 1069 MPa (95 to 140 ksi grade). Hereunder, tempering temperatures in a case where it is intended to obtain yield strengths of 95 ksi grade, 110 ksi grade, 125 ksi grade, and 140 ksi grade are described in detail.

[Tempering Temperature when Yield Strength is 95 Ksi Grade]

In a case where it is intended to obtain a yield strength of 95 ksi grade (655 to less than 758 MPa), a preferable tempering temperature is within the range of 650 to 740° C. If the tempering temperature is too high, in some cases the dislocation density is reduced too much and a yield strength of 95 ksi grade cannot be obtained. On the other hand, if the tempering temperature is too low, in some cases the dislocation density cannot be adequately reduced. In such a case, the yield strength of the steel material becomes too high and/or the SSC resistance of the steel material decreases.

Accordingly, in a case where it is intended to obtain a yield strength of 95 ksi grade, it is preferable to set the tempering temperature within the range of 650 to 740° C. When it is intended to obtain a yield strength of 95 ksi grade, a more preferable lower limit of the tempering temperature is 670° C., and further preferably is 680° C. When it is intended to obtain a yield strength of 95 ksi grade, a more preferable upper limit of the tempering temperature is 730° C., and further preferably is 720° C.

[Tempering Temperature when Yield Strength is 110 Ksi Grade]

In a case where it is intended to obtain yield strength of 110 ksi grade (758 to less than 862 MPa), a preferable tempering temperature is within the range of 650 to 720° C. If the tempering temperature is too high, in some cases the dislocation density is reduced too much and a yield strength of 110 ksi grade cannot be obtained. On the other hand, if the tempering temperature is too low, in some cases the dislocation density cannot be adequately reduced. In such a case, the yield strength of the steel material becomes too high and/or the SSC resistance of the steel material decreases.

Accordingly, in a case where it is intended to obtain a yield strength of 110 ksi grade, it is preferable to set the tempering temperature within the range of 650 to 720° C. When it is intended to obtain a yield strength of 110 ksi grade, a more preferable lower limit of the tempering temperature is 660° C. and further preferably is 670° C. When it is intended to obtain a yield strength of 110 ksi grade, a more preferable upper limit of the tempering temperature is 715° C., and further preferably is 710° C.

[Tempering Temperature when Yield Strength is 125 Ksi Grade]

In a case where it is intended to obtain a yield strength of 125 ksi grade (862 to less than 965 MPa), a preferable tempering temperature is within the range of 650 to 720° C. If the tempering temperature is too high, in some cases the dislocation density is reduced too much and a yield strength of 125 ksi grade cannot be obtained. On the other hand, if the tempering temperature is too low, in some cases the dislocation density cannot be adequately reduced. In such a case, the yield strength of the steel material becomes too high and/or the SSC resistance of the steel material decreases.

Accordingly, in a case where it is intended to obtain a yield strength of 125 ksi grade, it is preferable to set the tempering temperature within the range of 650 to 720° C. When it is intended to obtain a yield strength of 125 ksi grade, a more preferable lower limit of the tempering temperature is 660° C., and further preferably is 670° C. When it is intended to obtain a yield strength of 125 ksi grade, a more preferable upper limit of the tempering temperature is 715° C., and further preferably is 710° C.

[Tempering Temperature when Yield Strength is 140 Ksi Grade]

In a case where it is intended to obtain a yield strength of 140 ksi grade (965 to 1069 MPa), a preferable tempering temperature is within the range of 620 to 720° C. If the tempering temperature is too high, in some cases the dislocation density is reduced too much and a yield strength of 140 ksi grade cannot be obtained. On the other hand, if the tempering temperature is too low, in some cases the dislocation density cannot be adequately reduced. In such a case, the yield strength of the steel material becomes too high and/or the SSC resistance of the steel material decreases.

Accordingly, in a case where it is intended to obtain a yield strength of 140 ksi grade, it is preferable to set the tempering temperature within the range of 620 to 720° C. When it is intended to obtain a yield strength of 140 ksi grade, a more preferable lower limit of the tempering temperature is 640° C., and further preferably is 650° C. When it is intended to obtain a yield strength of 140 ksi grade, a more preferable upper limit of the tempering temperature is 700° C., and further preferably is 690° C.

As described above, in the tempering process according to the present embodiment, the tempering temperature is appropriately controlled in accordance with the yield strength which it is intended to obtain (95 ksi grade, 110 ksi grade, 125 ksi grade, and 140 ksi grade). Note that, a person skilled in the art will be sufficiently capable of making the yield strength of the steel material containing the aforementioned chemical composition fall within the intended range by appropriately adjusting the undermentioned holding time at the aforementioned tempering temperature.

In the tempering process according to the present embodiment, a preferable holding time for tempering (tempering time) is within the range of 10 to 180 minutes. Here, the tempering time (holding time) means the period of time from the inserting of the intermediate steel material into the heat treatment furnace till the extracting.

If the tempering time is too short, in some cases the microstructure principally composed of tempered martensite and tempered bainite is not obtained. On the other hand, if the tempering time is too long, the aforementioned effects are saturated. If the tempering time is too long, in some cases the desired yield strength cannot be obtained. Therefore, in the tempering process according to the present embodiment, the tempering time is preferably set within the range of 10 to 180 minutes.

A more preferable lower limit of the tempering time is 15 minutes. A more preferable upper limit of the tempering time is 120 minutes, and further preferably is 90 minutes. Note that, in a case where the steel material is a steel pipe, in comparison to other shapes, temperature variations with respect to the steel pipe are liable to occur during holding for tempering. Therefore, in a case where the steel material is a steel pipe, the tempering time is preferably set within a range of 15 to 180 minutes.

[Regarding Heating Rate in Tempering and Cooling Rate after Tempering]

In a conventional tempering process, desired mechanical properties are obtained by controlling only the tempering temperature and the tempering time. However, if only the tempering temperature and the tempering time are controlled, in some cases a large amount of carbides precipitate in cooling after the tempering. Around the precipitating carbides, strain occurs in a crystal orientation.

That is, in the case of controlling only the tempering temperature and the tempering time, strain occurs around a large amount of the precipitates, and in some cases the proportion of KAM values of 1° or less of the steel material decreases. In such a case, the SSC resistance of the steel material will decrease. On the other hand, if the cooling rate after tempering is increased, a precipitation amount of carbides in the microstructure of the steel material after tempering can be reduced. In this case, in the microstructure of the steel material, the proportion of the region having KAM values of 1° or less increases, and the SSC resistance of the steel material can be enhanced.

Further, around coarse carbides microscopic strain is liable to become large. Note that, among the precipitating carbides, carbides precipitating at grain boundaries become easily coarse. The present inventors consider that the reason for this is as follows.

In the microstructure of the steel material after quenching, almost all of carbon (C) dissolves. Next, when tempering is performed, fine carbides precipitate from grain boundaries until the temperature reaches the tempering temperature. The carbides precipitating from the grain boundaries grow and become gradually large during subsequent holding at the tempering temperature and the subsequent allowing cooling. As a result, a large number of coarse carbides precipitate at grain boundaries.

By the aforementioned mechanism, if the heating rate in the tempering process is increased, the precipitation of the carbides is reduced, and the coarsening of the carbides in the microstructure of the steel material can be suppressed. As a result, the proportion of the region having KAM values of 1 or less of the steel material increases, and the SSC resistance of the steel material can be enhanced.

Therefore, in a method for producing the steel material according to the present embodiment, both the heating rate of tempering and the cooling rate after tempering are controlled in the tempering process. That is, in the tempering process according to the present embodiment, by controlling the heating rate in tempering and the cooling rate after tempering, regions each having a KAM value of 1° or less are increased in the microstructure of the steel material.

Specifically, the heating rate at the time of tempering is controlled as follows. In the tempering process, the average heating rate when the temperature of the intermediate steel material (hollow shell) is within the range of 100 to 600° C. during tempering is defined as a heating rate during tempering $HR_{100-600}$.

If the heating rate during tempering $HR_{100-600}$ is too low, as described above, in some cases carbides after tempering become coarse. In this case, in the microstructure of the steel material, the proportion of the region having KAM values of 1° or less decreases, and the SSC resistance of the steel material decreases. On the other hand, also if the heating rate during tempering $HR_{100-600}$ is too high, the aforementioned effects are saturated.

Therefore, in the tempering process according to the present embodiment, the heating rate during tempering $HR_{100-600}$ is preferably set within the range of more than 10 to 50° C./min. Note that the heating rate during tempering $HR_{100-600}$ is measured at a region that is most slowly cooled within a cross-section of the intermediate steel material that is being tempered (for example, in the case of forcedly cooling both surfaces, the cooling rate is measured at the center portion of the thickness of the intermediate steel material).

A more preferable lower limit of the heating rate during tempering $HR_{100-600}$ is 13° C./min, and further preferably is 15° C./min. A more preferable upper limit of the heating rate during tempering $HR_{100-600}$ is 40° C./min, and further preferably is 30° C./min.

The cooling rate after tempering is controlled as follows. In the tempering process, the average cooling rate when the temperature of the intermediate steel material (hollow shell) is within the range of 600 to 200° C. after tempering is defined as a cooling rate after tempering $CR_{600-200}$.

As described above, if the cooling rate after tempering $CR_{600-200}$ is too low, in some cases a large number of carbides precipitate in the microstructure of the steel material. In this case, in the microstructure of the steel material, the region having a KAM value of 1° or less decreases, and the SSC resistance of the steel material decreases.

Therefore, in the tempering process according to the present embodiment, the cooling rate after tempering $CR_{600-200}$ is preferably set within the range of 5 to 100° C./sec. Note that the cooling rate after tempering $CR_{600-200}$ is measured at a region that is most slowly cooled within a cross-section of the intermediate steel material that is being tempered (for example, in the case of forcedly cooling both surfaces, the cooling rate is measured at the center portion of the thickness of the intermediate steel material).

A more preferable lower limit of the cooling rate after tempering $CR_{600-200}$ is 10° C./sec, and further preferably is 15° C./sec. A more preferable upper limit of the cooling rate after tempering $CR_{600-200}$ is less than 100° C./sec, and further preferably is 70° C./sec.

The heating method in which the heating rate during tempering $HR_{100-600}$ is set within the range of more than 10 to 50° C./min is not particularly limited, and a well-known method can be used. The cooling method in which the cooling rate after tempering $CR_{600-200}$ is set within the range of 5 to 100° C./sec is not particularly limited, and a well-known method can be used. The cooling method, for example, continuously forcedly cools the hollow shell from the tempering temperature, and continuously decreases the surface temperature of the hollow shell. As such a continuous cooling treatment, for example, there is a method that cools the hollow shell by immersing the hollow shell in a water bath, or a method that cools the hollow shell in an accelerated manner by shower water cooling, mist cooling, or forced-air cooling.

Note that, in the case where tempering is performed a plurality of times, it may be controlled the cooling after the final tempering. That is, the cooling after the tempering except for the final tempering may be performed as same as conventional manner.

The steel material according to the present embodiment can be produced by the production method that is described above. A method for producing a seamless steel pipe has been described as one example of the aforementioned production method. However, the steel material according to the present embodiment may be a steel plate or another shape. A method for producing a steel plate or a steel material of another shape also includes, for example, a preparation process, a quenching process and a tempering process, similarly to the production method described above. However, the aforementioned production method is one example, and the steel material according to the present embodiment may also be produced by another production method.

Hereunder, the present invention is described more specifically by way of examples.

Example 1

In Example 1, the SSC resistance of a steel material having a yield strength of 95 ksi grade (655 to less than 758 MPa) was investigated. Specifically, molten steels containing the chemical compositions shown in Table 1 were produced.

TABLE 1

| | Chemical Composition (Unit is mass %; balance is Fe and impurities) | | | | | | | | | | | |
|---|---|---|---|---|---|---|---|---|---|---|---|---|
| Steel | C | Si | Mn | P | S | Al | Cr | Mo | Ti | Nb | B | N |
| 1-A | 0.28 | 0.24 | 0.45 | 0.005 | 0.0015 | 0.025 | 0.60 | 0.47 | 0.020 | 0.025 | 0.0013 | 0.0030 |
| 1-B | 0.22 | 0.31 | 0.41 | 0.005 | 0.0019 | 0.025 | 0.83 | 0.71 | 0.020 | 0.025 | 0.0013 | 0.0030 |
| 1-C | 0.27 | 0.21 | 0.48 | 0.005 | 0.0033 | 0.025 | 1.13 | 0.46 | 0.020 | 0.025 | 0.0013 | 0.0030 |
| 1-D | 0.25 | 0.35 | 0.44 | 0.005 | 0.0025 | 0.025 | 1.05 | 0.32 | 0.020 | 0.025 | 0.0013 | 0.0030 |
| 1-E | 0.24 | 0.32 | 0.46 | 0.005 | 0.0029 | 0.025 | 0.65 | 0.59 | 0.020 | 0.025 | 0.0013 | 0.0030 |
| 1-F | 0.28 | 0.24 | 0.41 | 0.005 | 0.0020 | 0.025 | 0.99 | 0.71 | 0.020 | 0.025 | 0.0013 | 0.0030 |
| 1-G | 0.23 | 0.25 | 0.42 | 0.005 | 0.0026 | 0.025 | 0.79 | 0.29 | 0.020 | 0.025 | 0.0013 | 0.0030 |
| 1-H | 0.21 | 0.30 | 0.43 | 0.005 | 0.0026 | 0.025 | 0.62 | 0.41 | 0.020 | 0.025 | 0.0013 | 0.0030 |
| 1-I | 0.27 | 0.29 | 0.41 | 0.005 | 0.0016 | 0.025 | 1.16 | 0.67 | 0.020 | 0.025 | 0.0013 | 0.0030 |
| 1-J | 0.29 | 0.25 | 0.43 | 0.005 | 0.0029 | 0.025 | 0.98 | 1.25 | 0.020 | 0.025 | 0.0013 | 0.0030 |
| 1-K | 0.28 | 0.26 | 0.49 | 0.005 | 0.0026 | 0.025 | 0.84 | 0.75 | 0.020 | 0.025 | 0.0013 | 0.0030 |
| 1-L | 0.28 | 0.23 | 0.47 | 0.005 | 0.0027 | 0.025 | 1.08 | 1.05 | 0.020 | 0.025 | 0.0013 | 0.0030 |
| 1-M | 0.28 | 0.30 | 0.47 | 0.005 | 0.0030 | 0.025 | 0.89 | 0.59 | 0.020 | 0.025 | 0.0013 | 0.0030 |
| 1-N | 0.29 | 0.34 | 0.47 | 0.005 | 0.0034 | 0.025 | 0.78 | 0.75 | 0.020 | 0.025 | 0.0013 | 0.0030 |
| 1-O | 0.27 | 0.27 | 0.46 | 0.005 | 0.0023 | 0.025 | 0.52 | 0.33 | 0.020 | 0.025 | 0.0013 | 0.0030 |
| 1-P | 0.30 | 0.33 | 0.47 | 0.005 | 0.0022 | 0.025 | 0.83 | 0.10 | 0.020 | 0.025 | 0.0013 | 0.0030 |
| 1-Q | 0.27 | 0.22 | 0.48 | 0.005 | 0.0055 | 0.025 | 0.95 | 0.62 | 0.020 | 0.025 | 0.0013 | 0.0030 |
| 1-R | 0.25 | 0.32 | 0.50 | 0.005 | 0.0021 | 0.025 | 1.18 | 0.25 | 0.020 | 0.025 | 0.0013 | 0.0030 |
| 1-S | 0.25 | 0.30 | 0.41 | 0.004 | 0.0010 | 0.030 | 1.05 | 0.68 | 0.006 | 0.027 | 0.0011 | 0.0030 |
| 1-T | 0.26 | 0.35 | 0.44 | 0.011 | 0.0015 | 0.020 | 1.06 | 0.68 | 0.020 | 0.025 | 0.0011 | 0.0035 |

| | Chemical Composition (Unit is mass %; balance is Fe and impurities) | | | | | | | | |
|---|---|---|---|---|---|---|---|---|---|
| Steel | O | V | Ca | Mg | Zr | REM | Co | W | Ni | Cu |
| 1-A | 0.0011 | — | — | — | — | — | 0.73 | — | — | — |
| 1-B | 0.0011 | 0.10 | — | — | — | — | 0.57 | — | — | — |
| 1-C | 0.0012 | — | — | — | — | — | 0.59 | — | — | 0.02 |
| 1-D | 0.0013 | — | — | — | — | — | 0.77 | — | 0.02 | — |
| 1-E | 0.0015 | — | 0.0015 | — | — | — | 0.58 | — | — | — |
| 1-F | 0.0011 | — | — | 0.0015 | — | — | 0.52 | — | — | — |
| 1-G | 0.0012 | — | — | — | — | 0.0021 | 0.62 | — | — | — |
| 1-H | 0.0013 | — | — | — | 0.0015 | — | 0.69 | — | — | — |
| 1-I | 0.0011 | — | — | — | — | — | 0.57 | 0.50 | — | — |
| 1-J | 0.0012 | 0.10 | — | — | — | — | 0.79 | — | — | 0.03 |
| 1-K | 0.0015 | 0.10 | — | 0.0015 | — | — | 0.88 | — | — | — |
| 1-L | 0.0015 | 0.10 | — | — | — | — | 0.94 | 0.50 | — | — |
| 1-M | 0.0015 | — | — | — | — | 0.0015 | 0.89 | — | — | 0.03 |

TABLE 1-continued

| | | | | | | | | | | |
|---|---|---|---|---|---|---|---|---|---|---|
| 1-N | 0.0015 | — | — | — | — | — | 0.86 | 0.50 | 0.02 | — |
| 1-O | 0.0015 | — | 0.0011 | — | — | — | 0.64 | 0.50 | — | — |
| 1-P | 0.0010 | — | — | — | — | — | — | — | — | — |
| 1-Q | 0.0010 | — | — | — | — | — | — | — | — | — |
| 1-R | 0.0050 | — | — | — | — | — | — | — | — | — |
| 1-S | 0.0009 | 0.09 | — | — | — | — | — | — | — | — |
| 1-T | 0.0020 | — | — | — | — | — | — | — | — | — |

Billets each having an outer diameter of 310 mm were produced using the aforementioned molten steels. The produced billets were heated at 1250° C., and thereafter were hot rolled to produce seamless steel pipes each having an outer diameter of 244.48 mm and a wall thickness of 13.84 mm. Sample materials having a thickness of 13.84 mm in a plate shape were taken from the produced seamless steel pipes such that the sample materials have a size enough for taking out specimens for use in evaluation tests, which will be described later.

Quenching and tempering were repeated twice on the sample material of each test number. The quenching temperature (° C.) in the present examples was brought to the temperature of the furnace in which the heating before quenching was performed. The holding time (mm) in the present examples was taken as the period of time from the inserting of the sample material of each test number into the heat treatment furnace which the heating before quenching was performed till the extracting. The tempering temperature (° C.) in the present examples was brought to the temperature of the furnace in which tempering was performed. The tempering time (min) in the present examples was taken as the period of time from the inserting of the sample material of each test number into the heat treatment furnace which tempering was performed till the extracting.

Specifically, the sample material of each test number was held at a quenching temperature of 920° C. for 10 minutes. The sample material of each test number after the holding was immersed in a water bath to perform water cooling. At this time, the cooling rate during quenching $CR_{800-500}$ of the first quenching was 300° C./min for the sample material of each test number. The cooling rate during quenching $CR_{800-500}$ was determined based on a temperature that was measured by a type K thermocouple of a sheath type that was inserted into the center portion of the thickness of the sample material in advance.

The first tempering was performed on the sample material of each test number after the first quenching. In the first tempering, the sample material of each test number was held at the tempering temperature of 700° C. for the tempering time of 30 minutes, and thereafter was allowed to cool to normal temperature.

The second tempering was performed on the sample material of each test number after the first quenching and the first tempering. Specifically, in the second quenching performed on the sample material of each test number, the quenching temperature (° C.) and the holding time (min) were as shown in Table 2. The sample material of each test number after the holding was immersed in a water bath to perform water cooling. At this time, the cooling rate during quenching $CR_{800-500}$ of the second quenching was 300° C./min.

TABLE 2

| | | Quenching | | | Tempering | | | | | | Proportion | |
|---|---|---|---|---|---|---|---|---|---|---|---|---|
| Test Number | Steel | Quenching Temperature (° C.) | Holding Time (min) | $HR_{100-800}$ (° C./min) | Tempering Temperature (° C.) | Tempering Time (min) | $CR_{800-200}$ (° C./sec) | YS (MPa) | TS (MPa) | YR (%) | Of KAM ≤1° (area %) | SSC Resistance Test |
| 1-1 | 1-A | 900 | 15 | 20 | 695 | 60 | 38.6 | 730 | 811 | 90 | 65 | E |
| 1-2 | 1-B | 900 | 15 | 10 | 720 | 60 | 0.04 | 668 | 746 | 90 | 26 | NA |
| 1-3 | 1-C | 900 | 15 | 5 | 690 | 60 | 0.05 | 727 | 809 | 90 | 31 | NA |
| 1-4 | 1-D | 900 | 15 | 20 | 690 | 70 | 33.1 | 725 | 797 | 91 | 78 | E |
| 1-5 | 1-E | 900 | 15 | 25 | 695 | 60 | 21.0 | 746 | 826 | 90 | 53 | E |
| 1-6 | 1-F | 900 | 15 | 20 | 695 | 60 | 56.8 | 717 | 791 | 91 | 61 | E |
| 1-7 | 1-G | 900 | 15 | 25 | 695 | 60 | 24.1 | 725 | 814 | 89 | 76 | E |
| 1-8 | 1-H | 900 | 15 | 30 | 695 | 60 | 28.8 | 686 | 756 | 91 | 74 | E |
| 1-9 | 1-I | 900 | 15 | 20 | 695 | 60 | 47.8 | 707 | 777 | 91 | 74 | E |
| 1-10 | 1-J | 900 | 15 | 20 | 720 | 60 | 43.3 | 687 | 771 | 89 | 65 | E |
| 1-11 | 1-K | 900 | 15 | 20 | 720 | 60 | 27.9 | 717 | 789 | 91 | 59 | E |
| 1-12 | 1-L | 900 | 15 | 20 | 720 | 60 | 27.4 | 725 | 806 | 90 | 54 | E |
| 1-13 | 1-M | 900 | 15 | 20 | 695 | 60 | 27.6 | 674 | 741 | 91 | 77 | E |
| 1-14 | 1-N | 900 | 15 | 20 | 695 | 60 | 51.3 | 680 | 756 | 90 | 62 | E |
| 1-15 | 1-O | 900 | 15 | 25 | 695 | 60 | 59.4 | 702 | 777 | 90 | 50 | E |
| 1-16 | 1-A | 900 | 15 | 5 | 695 | 60 | 30.5 | 726 | 810 | 90 | 22 | NA |
| 1-17 | 1-A | 900 | 15 | 20 | 695 | 60 | 0.05 | 727 | 809 | 90 | 32 | NA |
| 1-18 | 1-P | 900 | 15 | 25 | 695 | 30 | 59.1 | 738 | 826 | 89 | 69 | NA |
| 1-19 | 1-Q | 900 | 15 | 25 | 695 | 60 | 35.1 | 711 | 796 | 89 | 64 | NA |
| 1-20 | 1-R | 900 | 15 | 30 | 695 | 60 | 32.0 | 673 | 746 | 90 | 75 | NA |
| 1-21 | 1-S | 900 | 15 | 20 | 720 | 60 | 25.4 | 751 | 834 | 90 | 54 | E |
| 1-22 | 1-T | 920 | 10 | 20 | 690 | 30 | 25.3 | 692 | 765 | 90 | 55 | E |

Next, the second tempering was performed on the sample material of each test number after the second quenching. Specifically, in the second tempering performed on a sample material of each test number, the heating rate during tempering $HR_{100-600}$ (° C./min), the tempering temperature (° C.), and the tempering time (min) were as shown in Table 2.

After the heat treatment was performed at each tempering temperature, the sample material of each test number was cooled. For the cooling, controlled cooling by mist water cooling from both sides of the steel material was performed. In tempering performed on the sample material of each test number, the cooling rate after tempering $CR_{600-200}$ (° C./sec) was those shown in Table 2. The heating rate during tempering $HR_{100-600}$ (° C./min) and the cooling rate after tempering $CR_{600-200}$ were determined based on a temperature that was measured by a type K thermocouple of a sheath type that was inserted into the center portion of the thickness of the sample material in advance.

[Evaluation tests]

The tensile test, the microstructure determination test, the KAM value measurement test, and the SSC resistance test that are described hereunder were performed on the sample material of each test number after the aforementioned tempering.

[Tensile Test]

The tensile test was performed in accordance with ASTM E8 (2013). Round bar tensile test specimens having a diameter of 8.9 mm and a parallel portion length of 35.6 mm were taken from the center portion of the thickness of the sample materials of each test number. The axial direction of the round bar test specimen was parallel to the rolling direction of the sample material (that is, the axial direction of the seamless steel pipe). The tensile test was performed in the atmosphere at normal temperature (25° C.) using the round bar test specimen of each test number, and the yield strength (MPa) and the tensile strength (MPa) were obtained.

Note that, in the present example 1, the 0.5% proof stress obtained in the tensile test was defined as the yield strength of each test number. The maximum stress in a uniform elongation was defined as the tensile strength. The ratio (YS/TS) between the determined yield strength (YS) and the determined tensile strength (TS) was defined as the yield ratio YR (%). The determined yield strength (YS), the determined tensile strength (TS), and the determined yield ratio (YR) are shown in Table 2.

[Microstructure Determination Test]

The sample material of each test number had a yield strength within the range of 655 to less than 758 MPa (95 ksi grade) and a yield ratio of 85% or more. Therefore, in the microstructure of the sample material of each test number, it was determined that the total volume ratio of the tempered martensite and the tempered bainite was 95% or more.

[KAM Value Measurement Test]

The proportion of KAM values of 1° or less was determined for the sample material of each test number. The proportion of KAM values of 1° or less was determined by the aforementioned method. The determined proportion of KAM values of 1° or less is shown in Table 2 as "Proportion Of KAM≤1° (area %)".

[SSC Resistance Test]

The four-point bending test was performed using the sample material of each test number, to evaluate the SSC resistance. Test specimens each having a thickness of 2 mm, a width of 10 mm, and a length of 75 mm were prepared from the center portion of the thickness of the sample material of each test number. The longitudinal direction of the test specimen was parallel to the rolling direction of the sample material (that is, the axial direction of the seamless steel pipe).

A stress was applied by four-point bending to the test specimens of each test number in accordance with ASTM G39-99 (2011) so that the stress applied to the test specimens was equivalent to 95% of the actual yield stress of the sample material of each test number. Two test specimens to which the stress was applied were enclosed in an autoclave, together with the test jig.

An aqueous solution containing 5.0 mass % of sodium chloride was employed as the test solution. The test solution at 24° C. was poured into the autoclave in a manner so as to leave a vapor phase portion, and this was adopted as the test bath. After degassing the test bath, 15 atm of $H_2S$ gas was sealed therein under pressure, and the test bath was stirred to cause the $H_2S$ gas to saturate in the test bath. After sealing the autoclave, the test bath was stirred at 24° C. for 720 hours (30 days).

After being held for 720 hours (30 days), the test specimens of each test number were observed to determine whether or not sulfide stress cracking (SSC) had occurred. Specifically, after being held for 720 hours (30 days), the test specimens were observed with the naked eye. Sample materials for which cracking was not confirmed in both of the test specimens as the result of the observation were determined as being "E" (Excellent). On the other hand, sample materials for which cracking was confirmed in at least one of the test specimen were determined as being "NA" (Not Acceptable).

[Test Results]

The test results are shown in Table 2.

Referring to Table 1 and Table 2, the chemical composition of the respective sample materials of Test Numbers 1-1, 1-4 to 1-15, 1-21, and 1-22 was appropriate, the yield strength was within the range of 655 to less than 758 MPa (95 ksi grade), and the yield ratio was 85% or more. In addition, the proportion of KAM 1° was 40 area % or more. As a result, the aforementioned sample materials exhibited excellent SSC resistance in the four-point bending test.

On the other hand, for the sample materials of Test Numbers 1-2 and 1-3, the heating rate during tempering $HR_{100-600}$ was too low. In addition, the cooling rate after tempering $CR_{600-200}$ was too low. Therefore, the proportion of KAM≤1° was less than 40 area %. As a result, the aforementioned sample materials did not exhibit excellent SSC resistance in the four-point bending test.

For the sample material of Test Number 1-16, the heating rate during tempering $HR_{100-600}$ was too low. Therefore, the proportion of KAM S P was less than 40 area %. As a result the aforementioned sample material did not exhibit excellent SSC resistance in the four-point bending test.

For the sample material of Test Number 1-17, the cooling rate after tempering $CR_{600-200}$ was too low. Therefore, the proportion of KAM≤1° was less than 40 area %. As a result, the aforementioned sample material did not exhibit excellent SSC resistance in the four-point bending test.

In the sample material of Test number 1-18, the Mo content was too low. As a result, the aforementioned sample material did not exhibit excellent SSC resistance in the four-point bending test.

In the sample material of Test number 1-19, the S content was too high. As a result, the aforementioned sample material did not exhibit excellent SSC resistance in the four-point bending test.

In the sample material of Test number 1-20, the O content was too high. As a result, the aforementioned sample material did not exhibit excellent SSC resistance in the four-point bending test.

Example 2

In Example 2, the SSC resistance of a steel material having a yield strength of 110 ksi grade (758 to less than 862

MPa) was investigated. Specifically, molten steels containing the chemical compositions shown in Table 3 were produced.

Quenching and tempering were repeated twice on the sample material of each test number. The quenching temperature (° C.) in the present examples was brought to the

TABLE 3

| Chemical Compositon (Unit is mass %; balance is Fe and impurities) | | | | | | | | | | | | |
|---|---|---|---|---|---|---|---|---|---|---|---|---|
| Steel | C | Si | Mn | P | S | Al | Cr | Mo | Ti | Nb | B | N |
| 2-A | 0.25 | 0.30 | 0.47 | 0.005 | 0.0010 | 0.025 | 1.10 | 0.71 | 0.020 | 0.020 | 0.0013 | 0.0025 |
| 2-B | 0.27 | 0.24 | 0.41 | 0.005 | 0.0010 | 0.027 | 0.94 | 0.78 | 0.006 | 0.020 | 0.0013 | 0.0025 |
| 2-C | 0.25 | 0.32 | 0.44 | 0.005 | 0.0008 | 0.027 | 1.09 | 0.75 | 0.006 | 0.020 | 0.0013 | 0.0025 |
| 2-D | 0.25 | 0.21 | 0.42 | 0.005 | 0.0009 | 0.031 | 1.08 | 0.68 | 0.004 | 0.020 | 0.0013 | 0.0025 |
| 2-E | 0.27 | 0.20 | 0.48 | 0.005 | 0.0007 | 0.027 | 0.80 | 0.65 | 0.005 | 0.020 | 0.0013 | 0.0025 |
| 2-F | 0.29 | 0.34 | 0.47 | 0.005 | 0.0010 | 0.027 | 0.95 | 0.73 | 0.006 | 0.020 | 0.0013 | 0.0025 |
| 2-G | 0.26 | 0.34 | 0.43 | 0.005 | 0.0010 | 0.027 | 0.65 | 0.62 | 0.006 | 0.020 | 0.0013 | 0.0025 |
| 2-H | 0.27 | 0.31 | 0.46 | 0.005 | 0.0010 | 0.027 | 1.09 | 1.30 | 0.006 | 0.020 | 0.0013 | 0.0025 |
| 2-I | 0.45 | 0.24 | 0.49 | 0.005 | 0.0010 | 0.027 | 1.17 | 1.25 | 0.004 | 0.020 | 0.0013 | 0.0025 |
| 2-J | 0.40 | 0.25 | 0.42 | 0.005 | 0.0010 | 0.027 | 0.89 | 1.30 | 0.006 | 0.020 | 0.0013 | 0.0025 |
| 2-K | 0.42 | 0.32 | 0.50 | 0.005 | 0.0010 | 0.027 | 1.13 | 1.62 | 0.006 | 0.020 | 0.0013 | 0.0025 |
| 2-L | 0.27 | 0.24 | 0.41 | 0.005 | 0.0010 | 0.027 | 0.94 | 0.78 | 0.006 | 0.020 | 0.0013 | 0.0025 |
| 2-M | 0.24 | 0.21 | 0.40 | 0.005 | 0.0008 | 0.027 | 1.12 | 1.31 | 0.005 | 0.020 | 0.0010 | 0.0025 |
| 2-N | 0.37 | 0.27 | 0.47 | 0.005 | 0.0008 | 0.027 | 0.73 | 0.92 | 0.006 | 0.020 | 0.0013 | 0.0025 |
| 2-O | 0.38 | 0.24 | 0.42 | 0.005 | 0.0010 | 0.027 | 1.05 | 0.56 | 0.006 | 0.020 | 0.0012 | 0.0025 |
| 2-P | 0.35 | 0.32 | 0.41 | 0.005 | 0.0010 | 0.027 | 1.09 | 0.92 | 0.005 | 0.020 | 0.0013 | 0.0025 |
| 2-Q | 0.50 | 0.31 | 0.47 | 0.005 | 0.0010 | 0.027 | 0.52 | 1.38 | 0.006 | 0.020 | 0.0012 | 0.0025 |
| 2-R | 0.27 | 0.25 | 0.49 | 0.005 | 0.0010 | 0.027 | 0.69 | 1.22 | 0.006 | 0.020 | 0.0013 | 0.0025 |
| 2-S | 0.41 | 0.31 | 0.47 | 0.005 | 0.0010 | 0.027 | 0.68 | 0.63 | 0.006 | 0.020 | 0.0010 | 0.0025 |
| 2-T | 0.35 | 0.25 | 0.50 | 0.005 | 0.0010 | 0.027 | 0.81 | 1.18 | 0.006 | 0.020 | 0.0010 | 0.0025 |
| 2-U | 0.44 | 0.30 | 0.47 | 0.005 | 0.0010 | 0.027 | 0.71 | 0.49 | 0.006 | 0.020 | 0.0010 | 0.0025 |
| 2-V | 0.36 | 0.34 | 0.49 | 0.005 | 0.0010 | 0.027 | 1.18 | 0.65 | 0.006 | 0.020 | 0.0010 | 0.0025 |
| 2-W | 0.26 | 0.22 | 0.41 | 0.005 | 0.0010 | 0.027 | 1.06 | 1.25 | 0.006 | 0.020 | 0.0010 | 0.0025 |
| 2-X | 0.36 | 0.33 | 0.48 | 0.005 | 0.0010 | 0.027 | 1.14 | 0.72 | 0.006 | 0.020 | 0.0010 | 0.0025 |
| 2-Y | 0.38 | 0.34 | 0.46 | 0.005 | 0.0010 | 0.027 | 0.79 | 0.20 | 0.006 | 0.020 | 0.0010 | 0.0025 |
| 2-Z | 0.35 | 0.27 | 0.49 | 0.005 | 0.0055 | 0.027 | 0.60 | 0.67 | 0.006 | 0.020 | 0.0010 | 0.8025 |

| Chemical Compositon (Unit is mass %; balance is Fe and impurities) | | | | | | | | | | |
|---|---|---|---|---|---|---|---|---|---|---|
| Steel | O | V | Ca | Mg | Zr | REM | Co | W | Ni | Cu |
| 2-A | 0.0010 | — | — | — | — | — | — | — | — | — |
| 2-B | 0.0013 | 0.09 | — | — | — | — | — | — | — | — |
| 2-C | 0.0009 | — | — | — | — | — | — | — | — | 0.02 |
| 2-D | 0.0014 | — | — | — | — | — | — | — | 0.02 | — |
| 2-E | 0.0014 | — | 00012 | — | — | — | — | — | — | — |
| 2-F | 0.0014 | — | — | 0.0012 | — | — | — | — | — | — |
| 2-G | 0.0014 | — | — | — | — | 0.0013 | — | — | — | — |
| 2-H | 0.0014 | 0.09 | — | — | 0.0015 | — | — | — | — | — |
| 2-I | 0.0014 | 0.09 | — | — | — | — | 0.50 | — | — | — |
| 2-J | 0.0014 | 0.09 | — | — | — | — | — | 0.50 | — | — |
| 2-K | 0.0014 | 0.09 | — | — | — | — | — | — | 0.02 | — |
| 2-L | 0.0014 | 0.09 | — | — | — | — | 0.50 | — | — | 0.02 |
| 2-M | 0.0014 | 0.09 | — | — | — | — | — | — | — | — |
| 2-N | 0.0014 | 0.09 | — | 0.0012 | — | — | — | 0.50 | — | — |
| 2-O | 0.0014 | 0.09 | — | — | — | — | — | — | — | — |
| 2-P | 0.0014 | 0.09 | — | — | — | — | — | — | — | 0.04 |
| 2-Q | 0.0014 | 0.09 | — | — | — | — | — | — | — | — |
| 2-R | 0.0014 | 0.09 | 0.0015 | — | — | — | — | — | — | — |
| 2-S | 0.0014 | 0.09 | — | 0.0012 | — | — | — | — | — | — |
| 2-T | 0.0014 | 0.09 | — | — | — | 0.0012 | — | — | — | — |
| 2-U | 0.0014 | 0.09 | — | — | 0.0013 | — | — | — | — | — |
| 2-V | 0.0014 | 0.09 | — | — | — | — | 0.50 | — | — | — |
| 2-W | 0.0014 | 0.09 | — | — | — | — | — | 0.50 | — | — |
| 2-X | 0.0053 | 0.09 | — | — | — | — | — | — | — | — |
| 2-Y | 0.0014 | 0.09 | — | — | — | — | — | — | — | — |
| 2-Z | 0.0014 | 0.09 | — | — | — | — | — | — | — | — |

Billets each having an outer diameter of 310 to 360 mm were produced using the aforementioned molten steels. The produced billets were heated at 1250° C., and thereafter were hot rolled to produce seamless steel pipes each having an outer diameter of 244.48 to 346.08 mm and a wall thickness of 13.84 to 15.88 mm. From the produced seamless steel pipes, sample materials that were large enough to allow test specimens used in the evaluation test that is described later to be taken, and had a thickness of 13.84 to 15.88 mm were taken.

temperature of the furnace in which the heating before quenching was performed. In a similar manner to Example 1, the holding time (min) in the present examples was taken as the period of time from the inserting of the sample material of each test number into the heat treatment furnace which the heating before quenching was performed till the extracting. The tempering temperature (° C.) in the present examples was brought to the temperature of the furnace in which tempering was performed. The tempering time (mm) in the present examples was taken as the period of time from the inserting of the sample material of each test number into the heat treatment furnace which tempering was performed till the extracting.

Specifically, the sample material of each test number was held at a quenching temperature of 920° C. for 10 minutes. The sample material of each test number after the holding was immersed in a water bath to perform water cooling. At this time, the cooling rate during quenching $CR_{800-500}$ of the first quenching was 300° C./min for the sample material of each test number. The cooling rate during quenching $CR_{800-500}$ was determined based on a temperature that was measured by a type K thermocouple of a sheath type that was inserted into the center portion of the thickness of the sample material in advance.

The first tempering was performed on the sample material of each test number after the first quenching. In the first tempering, the sample material of each test number was held at the tempering temperature of 700° C. for the tempering time of 30 minutes, and thereafter was allowed to cool to normal temperature.

The second tempering was performed on the sample material of each test number after the first quenching and the first tempering. Specifically, in the second quenching performed on the sample material of each test number, the quenching temperature (° C.) and the holding time (min) were as shown in Table 4. The sample material of each test number after the holding was immersed in a water bath to perform water cooling. At this time, the cooling rate during quenching $CR_{800-800}$ of the second quenching was 300° C./min.

Next, the second tempering was performed on the sample material of each test number after the second quenching. Specifically, in the second tempering performed on a sample material of each test number, the heating rate during tempering $HR_{100-600}$ (C/mmi) the tempering temperature (° C.), and the tempering time (min) were as shown in Table 4.

After the heat treatment was performed at each tempering temperature, the sample material of each test number was cooled. For the cooling, controlled cooling by mist water cooling from both sides of the steel material was performed. In tempering performed on the sample material of each test number, the cooling rate $CR_{600-200}$ (° C./sec) after tempering was those shown in Table 4. Note that, the heating rate during tempering $HR_{100-600}$ (° C./min) and the cooling rate after tempering $CR_{600-200}$ were determined based on a temperature that was measured by a type K thermocouple of a sheath type that was inserted into the center portion of the thickness of the sample material in advance.

[Evaluation Tests]

The tensile test, the microsucture determination test, the KAM value measurement test, and the SSC resistance test that are described hereunder were performed on the sample material of each test number after the aforementioned tempering.

[Tensile Test]

A tensile test was performed in accordance with ASTM E8 (2013) in a similar manner to Example 1. The tensile test was performed in the atmosphere at normal temperature (25° C.) using the round bar test specimen of each test number prepared in a similar manner to Example 1, and the yield strength (MPa) and the tensile strength (MPa) were obtained.

TABLE 4

| | | Quenching | | Tempering | | | | | | Proportion | |
| | | Quenching Temperature | Holding Time | | Tempering Temperature | Tempering Time | | YS | TS | YR | Of KAM ≤1° | SSC Resistance |
| Test Number | Steel | (° C.) | (min) | $HR_{100-800}$ (° C./min) | (° C.) | (min) | $CR_{800-200}$ (° C./sec) | (MPa) | (MPa) | (%) | (area %) | Test |
|---|---|---|---|---|---|---|---|---|---|---|---|---|
| 2-1 | 2-A | 900 | 15 | 20 | 675 | 30 | 22.0 | 817 | 895 | 91 | 71 | E |
| 2-2 | 2-A | 900 | 15 | 10 | 670 | 60 | 0.1 | 771 | 847 | 91 | 25 | NA |
| 2-3 | 2-A | 900 | 15 | 20 | 670 | 60 | 43.8 | 786 | 838 | 94 | 63 | E |
| 2-4 | 2-A | 900 | 15 | 20 | 675 | 200 | 58.8 | 725 | 795 | 91 | 52 | E |
| 2-5 | 2-A | 900 | 15 | 25 | 675 | 30 | 47.3 | 791 | 855 | 93 | 56 | E |
| 2-6 | 2-B | 900 | 15 | 20 | 700 | 60 | 37.1 | 831 | 913 | 91 | 79 | E |
| 2-7 | 2-C | 900 | 15 | 20 | 670 | 60 | 51.7 | 801 | 879 | 91 | 50 | E |
| 2-8 | 2-D | 900 | 15 | 20 | 670 | 60 | 29.1 | 794 | 865 | 92 | 62 | E |
| 2-9 | 2-E | 900 | 15 | 20 | 670 | 60 | 53.7 | 829 | 904 | 92 | 72 | E |
| 2-10 | 2-F | 900 | 15 | 20 | 670 | 60 | 54.5 | 800 | 864 | 93 | 75 | E |
| 2-11 | 2-G | 900 | 15 | 25 | 670 | 60 | 45.8 | 767 | 826 | 93 | 61 | E |
| 2-12 | 2-H | 900 | 15 | 20 | 700 | 60 | 22.0 | 817 | 871 | 94 | 56 | E |
| 2-13 | 2-I | 900 | 15 | 20 | 700 | 60 | 43.1 | 820 | 894 | 92 | 69 | E |
| 2-14 | 2-J | 900 | 15 | 20 | 695 | 30 | 34.3 | 845 | 925 | 91 | 77 | E |
| 2-15 | 2-K | 900 | 15 | 25 | 700 | 30 | 27.8 | 830 | 906 | 92 | 51 | E |
| 2-16 | 2-L | 900 | 15 | 20 | 705 | 30 | 25.3 | 829 | 903 | 92 | 62 | E |
| 2-17 | 2-M | 900 | 15 | 20 | 700 | 60 | 20.4 | 824 | 890 | 93 | 72 | E |
| 2-18 | 2-N | 900 | 15 | 20 | 700 | 60 | 50.3 | 813 | 886 | 92 | 72 | E |
| 2-19 | 2-O | 900 | 15 | 20 | 700 | 60 | 42.5 | 851 | 915 | 93 | 70 | E |
| 2-20 | 2-P | 900 | 15 | 20 | 700 | 30 | 51.1 | 832 | 898 | 93 | 57 | E |
| 2-21 | 2-Q | 900 | 15 | 30 | 695 | 30 | 42.7 | 855 | 932 | 92 | 65 | E |
| 2-22 | 2-R | 900 | 15 | 20 | 700 | 60 | 56.8 | 833 | 900 | 93 | 76 | E |
| 2-23 | 2-S | 900 | 15 | 20 | 700 | 60 | 53.2 | 847 | 903 | 94 | 63 | E |
| 2-24 | 2-T | 900 | 15 | 20 | 700 | 60 | 43.1 | 839 | 914 | 92 | 72 | E |
| 2-25 | 2-U | 900 | 15 | 20 | 700 | 60 | 42.0 | 829 | 907 | 91 | 65 | E |
| 2-26 | 2-V | 900 | 15 | 25 | 700 | 60 | 54.8 | 830 | 912 | 91 | 70 | E |
| 2-27 | 2-W | 900 | 15 | 20 | 700 | 30 | 53.1 | 835 | 918 | 91 | 55 | E |
| 2-28 | 2-X | 900 | 15 | 25 | 700 | 60 | 52.7 | 809 | 883 | 92 | 79 | NA |
| 2-29 | 2-Y | 900 | 15 | 20 | 700 | 30 | 46.1 | 856 | 918 | 93 | 52 | NA |
| 2-30 | 2-Z | 900 | 15 | 20 | 700 | 60 | 37.8 | 761 | 825 | 92 | 57 | NA |
| 2-31 | 2-Q | 900 | 15 | 5 | 705 | 30 | 26.5 | 772 | 849 | 91 | 15 | NA |
| 2-32 | 2-Q | 900 | 10 | 20 | 705 | 30 | 0.1 | 779 | 847 | 92 | 22 | NA |

Note that, in the present examples, the 0.7% proof stress obtained in the tensile test was defined as the yield strength of each test number. The maximum stress in a uniform elongation was defined as the tensile strength. The ratio (YS/TS) between the determined yield strength (YS) and the determined tensile strength (TS) was defined as the yield ratio YR (%). The determined yield strength (YS), the determined tensile strength (TS), and the determined yield ratio (YR) are shown in Table 4.

[Microstructure Determination Test]

The sample material of each test number had a yield strength within the range of 758 to less than 862 MPa (110 ksi grade) and a yield ratio of 85% or more. Therefore, in the microstructure of the sample material of each test number, it was determined that the total volume ratio of the tempered martensite and the tempered bainite was 95% or more.

[KAM Value Measurement Test]

The proportion of KAM values of 1° or less was determined for the sample material of each test number. The proportion of KAM values of 1° or less was determined by the aforementioned method. The determined proportion of KAM values of 1° or less is shown in Table 4 as "PROPORTION OF KAM 1° (area %)".

[SSC Resistance Test]

The four-point bending test was performed using the sample material of each test number, to evaluate the SSC resistance. Test specimens of each test number were prepared in a similar manner to Example 1. A stress was applied by four-point bending to the test specimens of each test number in accordance with ASTM G39-99 (2011) so that the stress applied to the test specimens was equivalent to 90% of the actual yield stress of the sample material of each test number. Two test specimens to which the stress was applied were enclosed in an autoclave, together with the test jig.

An aqueous solution containing 5.0 mass % of sodium chloride was employed as the test solution. The test solution at 24° C. was poured into the autoclave in a manner so as to leave a vapor phase portion, and this was adopted as the test bath. After degassing the test bath, 15 atm of $H_2S$ gas was sealed therein under pressure, and the test bath was stirred to cause the $H_2S$ gas to saturate in the test bath. After sealing the autoclave, the test bath was stirred at 24° C. for 720 hours (30 days).

After being held for 720 hours (30 days), the test specimens of each test number were observed to determine whether or not sulfide stress cracking (SSC) had occurred. Specifically, after being held for 720 hours (30 days), the test specimens were observed with the naked eye. Sample materials for which cracking was not confirmed in both of the test specimens as the result of the observation were determined as being "E" (Excellent). On the other hand, sample materials for which cracking was confirmed in at least one of the test specimen were determined as being "NA" (Not Acceptable).

[Test Results]

The test results are shown in Table 4.

Referring to Table 3 and Table 4, the chemical composition of the respective sample materials of Test Numbers 2-1, 2-3, and 2-5 to 2-27 was appropriate, the yield strength was within the range of 758 to less than 862 MPa (110 ksi grade), and the yield ratio was 85% or more. In addition, the proportion of KAM 510 was 40 area % or more. As a result, the aforementioned sample materials exhibited excellent SSC resistance in the four-point bending test.

On the other hand, for the sample material of Test Number 2-2, the heating rate during tempering $HR_{100\text{-}600}$ was too low. In addition, the cooling rate after tempering $CR_{600\text{-}200}$ was too low. Therefore, the proportion of KAM≤1° was less than 40 area %. As a result, the aforementioned sample material did not exhibit excellent SSC resistance in the four-point bending test.

For the sample material of Test number 2-4, the tempering time was too low. Consequently, the yield strength was less than 758 MPa. That is, the yield strength of 110 ksi grade was not obtained.

In the sample material of Test number 2-28, the O content was too high. As a result, the aforementioned sample material did not exhibit excellent SSC resistance in the four-point bending test.

In the sample material of Test number 2-29, the Mo content was too low. As a result, the aforementioned sample material did not exhibit excellent SSC resistance in the four-point bending test.

In the sample material of Test number 2-30, the S content was too low. As a result, the aforementioned sample material did not exhibit excellent SSC resistance in the four-point bending test.

For the sample material of Test Number 2-31, the heating rate during tempering $HR_{100\text{-}600}$ was too low. Therefore, the proportion of KAM 51° was less than 40 area %. As a result, the aforementioned sample material did not exhibit excellent SSC resistance in the four-point bending test.

For the sample material of Test Number 2-32, the cooling rate after tempering $CR_{600\text{-}200}$ was too low. Therefore, the proportion of KAM≤1° was less than 40 area %. As a result, the aforementioned sample material did not exhibit excellent SSC resistance in the four-point bending test.

Example 3

In Example 3, the SSC resistance of a steel material having a yield strength of 125 ksi grade (862 to less than 965 MPa) was investigated. Specifically, molten steels containing chemical compositions shown in Table 5 were produced.

TABLE 5

| | Chemical Composition (Unit is mass %; balance is Fe and impurities) | | | | | | | | | | | |
|---|---|---|---|---|---|---|---|---|---|---|---|---|
| Steel | C | Si | Mn | P | S | Al | Cr | Mo | Ti | Nb | B | N |
| 3-A | 0.42 | 0.32 | 0.43 | 0.005 | 0.0015 | 0.025 | 0.41 | 0.65 | 0.005 | 0.025 | 0.0012 | 0.0035 |
| 3-B | 0.41 | 0.24 | 0.40 | 0.005 | 0.0008 | 0.025 | 0.68 | 0.95 | 0.006 | 0.025 | 0.0012 | 0.0031 |
| 3-C | 0.40 | 0.26 | 0.45 | 0.005 | 0.0006 | 0.025 | 0.76 | 1.25 | 0.006 | 0.025 | 0.0012 | 0.0031 |
| 3-D | 0.41 | 0.28 | 0.44 | 0.005 | 0.0010 | 0.025 | 0.68 | 1.12 | 0.006 | 0.027 | 0.0012 | 0.0031 |
| 3-E | 0.37 | 0.22 | 0.47 | 0.005 | 0.0010 | 0.025 | 0.81 | 0.74 | 0.006 | 0.025 | 0.0012 | 0.0031 |
| 3-F | 0.27 | 0.29 | 0.47 | 0.005 | 0.0010 | 0.025 | 0.43 | 1.24 | 0.006 | 0.025 | 0.0012 | 0.0031 |
| 3-G | 0.26 | 0.30 | 0.41 | 0.005 | 0.0010 | 0.025 | 1.02 | 0.90 | 0.006 | 0.027 | 0.0012 | 0.0031 |
| 3-H | 0.40 | 0.32 | 0.41 | 0.005 | 0.0010 | 0.025 | 0.74 | 0.53 | 0.006 | 0.025 | 0.0012 | 0.0031 |

TABLE 5-continued

| Steel | | | | | | | | | | | | |
|---|---|---|---|---|---|---|---|---|---|---|---|---|
| 3-I | 0.44 | 0.34 | 0.48 | 0.005 | 0.0010 | 0.025 | 0.58 | 0.73 | 0.006 | 0.025 | 0.0012 | 0.0031 |
| 3-J | 0.26 | 0.25 | 0.40 | 0.004 | 0.0009 | 0.025 | 1.04 | 0.68 | 0.005 | 0.025 | 0.0012 | 0.0032 |
| 3-K | 0.28 | 0.30 | 0.49 | 0.005 | 0.0010 | 0.025 | 0.99 | 0.58 | 0.006 | 0.027 | 0.0012 | 0.0031 |
| 3-L | 0.37 | 0.33 | 0.45 | 0.005 | 0.0010 | 0.025 | 0.96 | 0.63 | 0.006 | 0.025 | 0.0012 | 0.0031 |
| 3-M | 0.30 | 0.22 | 0.42 | 0.005 | 0.0010 | 0.025 | 0.65 | 0.50 | 0.006 | 0.025 | 0.0012 | 0.0031 |
| 3-N | 0.32 | 0.25 | 0.42 | 0.005 | 0.0010 | 0.025 | 0.59 | 0.79 | 0.006 | 0.025 | 0.0012 | 0.0031 |
| 3-O | 0.37 | 0.26 | 0.44 | 0.005 | 0.0054 | 0.025 | 0.62 | 1.26 | 0.006 | 0.025 | 0.0012 | 0.0031 |
| 3-P | 0.28 | 0.23 | 0.47 | 0.005 | 0.0010 | 0.052 | 0.59 | 0.79 | 0.006 | 0.025 | 0.0012 | 0.0031 |
| 3-Q | 0.39 | 0.26 | 0.47 | 0.005 | 0.0010 | 0.025 | 0.99 | 1.01 | 0.006 | 0.025 | 0.0012 | 0.0075 |

| | Chemical Composition (Unit is mass %; balance is Fe and impurities) | | | | | | | | | |
|---|---|---|---|---|---|---|---|---|---|---|
| Steel | O | V | Ca | Mg | Zr | REM | Co | W | Ni | Cu |
| 3-A | 0.0015 | 0.09 | — | — | — | — | — | — | — | — |
| 3-B | 0.0015 | 0.10 | — | — | — | — | — | — | — | 0.02 |
| 3-C | 0.0015 | 0.10 | — | — | — | — | — | — | 0.02 | — |
| 3-D | 0.0015 | 0.09 | 0.0012 | — | — | — | — | — | — | — |
| 3-E | 0.0015 | 0.10 | — | 0.0012 | — | — | — | — | — | — |
| 3-F | 0.0015 | 0.10 | — | — | — | 0.0012 | — | — | — | — |
| 3-G | 0.0015 | 0.09 | — | — | 0.0012 | — | — | — | — | — |
| 3-H | 0.0015 | 0.10 | — | — | — | — | — | 0.50 | — | — |
| 3-I | 0.0015 | 0.10 | — | — | — | — | 0.50 | — | — | — |
| 3-J | 0.0009 | — | — | — | — | — | — | — | — | — |
| 3-K | 0.0015 | 0.10 | 0.0012 | — | — | — | — | — | — | 0.02 |
| 3-L | 0.0015 | 0.10 | — | — | — | — | — | 0.50 | 0.02 | — |
| 3-M | 0.0015 | 0.10 | — | 0.0012 | — | — | 0.50 | — | — | — |
| 3-N | 0.0015 | 0.10 | — | — | — | — | — | — | — | — |
| 3-O | 0.0015 | 0.10 | — | — | — | — | — | — | — | — |
| 3-P | 0.0015 | 0.10 | — | — | — | — | — | — | — | — |
| 3-Q | 0.0015 | 0.10 | — | — | — | — | — | — | — | — |

Billets each having an outer diameter of 310 mm were produced using the aforementioned molten steels. The produced billets were heated at 1250° C., and thereafter were hot rolled to produce seamless steel pipes each having an outer diameter of 244.48 mm and a wall thickness of 13.84 mm. Sample materials were taken from the produced seamless steel pipes such that the sample materials have a size enough for taking out specimens for use in evaluation tests, which will be described later, and had a thickness of 13.84 mm were taken.

Quenching and tempering were repeated twice on the sample material of each test number. The quenching temperature (° C.) in the present examples was brought to the temperature of the furnace in which the heating before quenching was performed. In a similar manner to Example 1, the holding time (min) in the present examples was taken as the period of time from the inserting of the sample material of each test number into the heat treatment furnace which the heating before quenching was performed till the extracting. The tempering temperature (° C.) in the present examples was brought to the temperature of the furnace in which tempering was performed. The tempering time (mm) in the present examples was taken as the period of time from the inserting of the sample material of each test number into the heat treatment furnace which tempering was performed till the extracting.

Specifically, the sample material of each test number was held at a quenching temperature of 920° C. for 10 minutes. The sample material of each test number after the holding was immersed in a water bath to perform water cooling. At this time, the cooling rate during quenching $CR_{800-500}$ of the first quenching was 300° C./min for the sample material of each test number. The cooling rate during quenching $CR_{800-500}$ was determined based on a temperature that was measured by a type K thermocouple of a sheath type that was inserted into the center portion of the thickness of the sample material in advance.

The first tempering was performed on the sample material of each test number after the first quenching. In the first tempering, the sample material of each test number was held at the tempering temperature of 670° C. for the tempering time of 30 minutes, and thereafter was allowed to cool to normal temperature.

The second tempering was performed on the sample material of each test number after the first quenching and the first tempering. Specifically, in the second quenching performed on the sample material of each test number, the quenching temperature (° C.) and the holding time (min) were as shown in Table 6. The sample material of each test number after the holding was immersed in a water bath to perform water cooling. At this time, the cooling rate during quenching $CR_{800-500}$ of the second quenching was 300° C./min.

TABLE 6

| | | Quenching | | | Tempering | | | | | | | SSC Resistance $K_{1SSC}$ (MPa√m) | | | |
|---|---|---|---|---|---|---|---|---|---|---|---|---|---|---|---|
| Test Number | Steel | Quenching Temperature (°C.) | Holding Time (min) | $HR_{100-600}$ (°C./min) | Tempering Temperature (°C.) | Tempering Time (min) | $CR_{800-200}$ (°C./sec) | YS (MPa) | TS (MPa) | YR (%) | Proportion Of KAM ≤1° (area %) | 1 | 2 | 3 | Average value |
| 3-1 | 3-A | 920 | 10 | 20 | 695 | 60 | 40 | 883 | 938 | 94 | 42 | 24 | 18 | 19 | 20 |
| 3-2 | 3-B | 900 | 15 | 20 | 690 | 30 | 20 | 924 | 372 | 95 | 50 | 21 | 20 | 16 | 19 |
| 3-3 | 3-C | 920 | 10 | 25 | 690 | 30 | 20 | 896 | 945 | 95 | 58 | 20 | 21 | 21 | 21 |
| 3-4 | 3-D | 920 | 15 | 20 | 690 | 30 | 10 | 931 | 993 | 94 | 49 | 23 | 21 | 22 | 22 |
| 3-5 | 3-E | 920 | 10 | 20 | 685 | 30 | 22 | 958 | 1020 | 94 | 36 | 19 | 16 | 17 | 17 |
| 3-6 | 3-F | 920 | 10 | 25 | 655 | 30 | 35 | 917 | 972 | 94 | 60 | 24 | 22 | 18 | 21 |
| 3-7 | 3-G | 920 | 10 | 20 | 685 | 30 | 16 | 945 | 1007 | 94 | 54 | 23 | 20 | 20 | 21 |
| 3-8 | 3-H | 920 | 10 | 20 | 690 | 30 | 22 | 889 | 945 | 94 | 57 | 23 | 19 | 22 | 21 |
| 3-9 | 3-I | 920 | 10 | 20 | 685 | 30 | 50 | 951 | 1034 | 92 | 44 | 18 | 24 | 21 | 21 |
| 3-10 | 3-J | 920 | 10 | 20 | 665 | 30 | 20 | 863 | 854 | 91 | 45 | 18 | 24 | 22 | 21 |
| 3-11 | 3-K | 920 | 10 | 10 | 690 | 30 | 0.5 | 917 | 986 | 93 | 20 | 12 | 13 | 15 | 13 |
| 3-12 | 3-L | 920 | 10 | 5 | 685 | 30 | 25 | 938 | 1000 | 94 | 25 | 13 | 13 | 13 | 13 |
| 3-13 | 3-M | 920 | 10 | 10 | 685 | 30 | 0.7 | 938 | 1007 | 93 | 15 | 14 | 13 | 11 | 13 |
| 3-14 | 3-N | 920 | 10 | 20 | 690 | 30 | 15 | 883 | 958 | 92 | 37 | 13 | 15 | 12 | 13 |
| 3-15 | 3-O | 920 | 10 | 20 | 685 | 30 | 22 | 963 | 1038 | 93 | 39 | 14 | 15 | 14 | 14 |
| 3-16 | 3-P | 920 | 10 | 20 | 690 | 30 | 16 | 888 | 962 | 92 | 37 | 12 | 13 | 15 | 13 |
| 3-17 | 3-Q | 920 | 10 | 20 | 685 | 30 | 23 | 961 | 1041 | 92 | 39 | 14 | 13 | 14 | 13 |
| 3-18 | 3-C | 920 | 10 | 10 | 690 | 30 | 45 | 883 | 959 | 92 | 20 | 12 | 11 | 12 | 12 |
| 3-19 | 3-C | 900 | 10 | 20 | 690 | 30 | 0.5 | 869 | 955 | 91 | 22 | 15 | 12 | 10 | 12 |

Next, the second tempering was performed on the sample material of each test number after the second quenching. Specifically, in the second tempering performed on a sample material of each test number, the heating rate during tempering $HR_{100-600}$ (° C./min), the tempering temperature (° C.), and the tempering time (min) were as shown in Table 6.

After the heat treatment was performed at each tempering temperature, the sample material of each test number was cooled. For the cooling, controlled cooling by mist water cooling from both sides of the steel material was performed. In tempering performed on the sample material of each test number, the cooling rate after tempering $CR_{600-200}$ (° C./sec) was those shown in Table 6. Note that, the heating rate during tempering $HR_{100-600}$ (C/min) and the cooling rate after tempering $CR_{600-200}$ were determined based on a temperature that was measured by a type K thermocouple of a sheath type that was inserted into the center portion of the thickness of the sample material in advance.

[Evaluation Tests]

The tensile test, the microstructure determination test, the KAM value measurement test, and the SSC resistance test that are described hereunder were performed on the sample material of each test number after the aforementioned tempering.

[Tensile Test]

A tensile test was performed in accordance with ASTM E8 (2013) in a similar manner to Example 1. The tensile test was performed in the atmosphere at normal temperature (25° C.) using the round bar test specimen of each test number prepared in a similar manner to Example 1, and the yield strength (MPa) and the tensile strength (MPa) were obtained.

Note that, in Example 3, the 0.65% proof stress obtained in the tensile test was defined as the yield strength of each test number. The maximum stress in a uniform elongation was defined as the tensile strength. The ratio (YS/TS) between the determined yield strength (YS) and the determined tensile strength (TS) was defined as the yield ratio YR (%). The determined yield strength (YS), the determined tensile strength (TS), and the determined yield ratio (YR) are shown in Table 6.

[Microstructure Determination Test]

The sample material of each test number had a yield strength within the range of 862 to less than 965 MPa (125 ksi grade) and a yield ratio of 85% or more. Therefore, in the microstructure of the sample material of each test number, it was determined that the total volume ratio of the tempered martensite and the tempered bainite was 95% or more.

[KAM Value Measurement Test]

The proportion of KAM values of 1° or less was determined for the sample material of each test number. The proportion of KAM values of 1° or less was determined by the aforementioned method. The determined proportion of KAM values of 1° or less is shown in Table 6 as "PROPORTION OF KAM≤1° (area %)".

[SSC Resistance Test]

A DCB test in accordance with "Method D" of NACE T0177-2005 was conducted using the sample material of each test number, and the SSC resistance was evaluated. Three DCB test specimens illustrated in FIG. 1A were prepared from the center portion of the thickness of the sample material of each test number. The longitudinal direction of the DCB test specimen was parallel to the rolling direction of the sample material (that is, the axial direction of the seamless steel pipe). In addition, a wedge illustrated in FIG. 1B was prepared from the sample material of each test number. The wedge had a thickness t of 2.82 mm. The aforementioned wedge was driven between arms of the DCB test specimen.

A mixed aqueous solution containing 5.0 mass % of sodium chloride and 0.4 mass % of sodium acetate that was adjusted to pH 3.5 using acetic acid (NACE solution B) was employed as the test solution. The test solution is poured into the test vessel with the DCB test specimen with the wedge driven enclosed in a manner so as to leave a vapor phase portion, and adopted as a test bath. After the test bath was degassed, a gaseous mixture of 0.03 atm $H_2S$ and 0.97 atm $CO_2$ was blown into the test vessel to make the test bath a corrosive environment. The inside of the test vessel was held at a temperature of 4° C. for 408 hours (17 days) while stirring the test bath. After being held, the DCB test specimen was taken out from the test vessel.

A pin was inserted into a hole formed in the tip of the arms of each DCB test specimen that was taken out and a notch portion was opened with a tensile testing machine, and a wedge releasing stress P was measured. In addition, the notch in the DCB test specimen being immersed in the test bath was released in liquid nitrogen, and a crack propagation length "a" with respect to crack propagation that occurred during immersion was measured. The crack propagation length "a" could be measured visually using vernier calipers. A fracture toughness value $K_{1SSC}$ (MPa√m) was determined using Formula (1) based on the obtained wedge releasing stress P and the crack propagation length "a". The arithmetic average of the three fracture toughness value $K_{1SSC}$ (MPa√m) was determined, and defined as the fracture toughness value $K_{1SSC}$ (MPa√m) of the sample material of the relevant test number.

$$K_{1SSC} = \frac{Pa\left(2\sqrt{3} + 2.38\frac{h}{a}\right)\left(\frac{B}{Bn}\right)^{\frac{1}{\sqrt{3}}}}{Bh^{\frac{3}{2}}} \quad (1)$$

In Formula (1), h (mm) represents the height of each arm of the DCB test specimen, B (mm) represents the thickness of the DCB test specimen, and Bn (mm) represents the web thickness of the DCB test specimen. These are defined in "Method D" of NACE TM0177-2005.

For the sample material of each test number, the obtained fracture toughness values $K_{1SSC}$ are shown in Table 6. If the fracture toughness value $K_{1SSC}$ that was defined as described above was 15 MPa√m or more, it was determined that the SSC resistance was good. Note that, the clearance between the arms when the wedge is driven in prior to immersion in the test bath influences the $K_{1SSC}$ value. Accordingly, actual measurement of the clearance between the arms was performed in advance using a micrometer, and it was also confirmed that the clearance was within the range in the API standards.

[Test Results]

The test results are shown in Table 6.

Referring to Table 5 and Table 6, the chemical composition of the respective sample materials of Test Numbers 3-1 to 3-10 was appropriate, the yield strength was within the range of 862 to less than 965 MPa (125 ksi grade), and the yield ratio was 85% or more. In addition, the proportion of KAM 1° was 35 area % or more. As a result, the fracture toughness value $K_{1SSC}$ was 15 MPa√m or more, and the sample material exhibited excellent SSC resistance.

On the other hand, for the sample material of Test Number 3-11, the heating rate during tempering $HR_{100-600}$ was too low. In addition, the cooling rate after tempering $CR_{600-200}$ was too low. Therefore, the proportion of KAM≤1° was less than 35 area %. As a result, the fracture toughness value $K_{1SSC}$ was less than 15 MPa√m, and the sample material did not exhibit excellent SSC resistance.

For the sample material of Test Number 3-12, the heating rate during tempering $HR_{100-600}$ was too low. Therefore, the proportion of KAM≤1° was less than 35 area %. As a result, the fracture toughness value $K_{1SSC}$ was less than 15 MPa√m, and the sample material did not exhibit excellent SSC resistance.

For the sample material of Test Number 3-13, the heating rate during tempering $HR_{100-600}$ was too low. In addition, the cooling rate after tempering $CR_{600-200}$ was too low. Therefore, the proportion of KAM≤1° was less than 35 area %. As a result, the fracture toughness value $K_{1SSC}$ was less than 15 MPa√m, and the sample material did not exhibit excellent SSC resistance.

In the sample material of Test number 3-14, the O content was too high. As a result, the fracture toughness value $K_{1SSC}$ was less than 15 MPa√m, and the sample material did not exhibit excellent SSC resistance.

In the sample material of Test number 3-15, the S content was too high. As a result, the fracture toughness value $K_{1SSC}$ was less than 15 MPa√m, and the sample material did not exhibit excellent SSC resistance.

In the sample material of Test number 3-16, the Al content was too high. As a result, the fracture toughness value $K_{1SSC}$ was less than 15 MPa√m, and the sample material did not exhibit excellent SSC resistance.

In the sample material of Test number 3-17, the N content was too high. As a result, the fracture toughness value $K_{1SSC}$ was less than 15 MPa√m, and the sample material did not exhibit excellent SSC resistance.

For the sample material of Test Number 3-18, the heating rate during tempering $HR_{100-600}$ was too low. Therefore, the proportion of KAM≤1° was less than 35 area %. As a result, the fracture toughness value $K_{1SSC}$ was less than 15 MPa√m, and the sample material did not exhibit excellent SSC resistance.

For the sample material of Test Number 3-19, the cooling rate after tempering $CR_{600-200}$ was too low. Therefore, the proportion of KAM≤1° was less than 35 area %. As a result, the fracture toughness value $K_{1SSC}$ was less than 15 MPa√m, and the sample material did not exhibit excellent SSC resistance.

Example 4

In Example 4, the SSC resistance of a steel material having a yield strength of 140 ksi grade (965 to 1069 MPa) was investigated. Specifically, molten steels containing chemical compositions shown in Table 7 were produced.

TABLE 7

| | Chemical Composition (Unit is mass %: balance is Fe and Impurities) | | | | | | | | | | | |
|---|---|---|---|---|---|---|---|---|---|---|---|---|
| Steel | C | Si | Mn | P | S | Al | Cr | Mo | Ti | Nb | B | N |
| 4-A | 0.33 | 0.27 | 0.45 | 0.005 | 0.0010 | 0.027 | 0.90 | 0.60 | 0.020 | 0.020 | 0.0015 | 0.0035 |
| 4-B | 0.20 | 0.35 | 0.44 | 0.005 | 0.0010 | 0.027 | 0.69 | 0.57 | 0.006 | 0.020 | 0.0015 | 0.0030 |
| 4-C | 0.31 | 0.34 | 0.48 | 0.005 | 0.0008 | 0.027 | 0.50 | 0.59 | 0.010 | 0.020 | 0.0011 | 0.0035 |
| 4-D | 0.33 | 0.22 | 0.49 | 0.005 | 0.0009 | 0.027 | 0.66 | 0.29 | 0.010 | 0.020 | 0.0011 | 0.0030 |
| 4-E | 0.28 | 0.21 | 0.42 | 0.005 | 0.0007 | 0.027 | 1.17 | 0.64 | 0.010 | 0.020 | 0.0012 | 0.0030 |
| 4-F | 0.26 | 0.30 | 0.46 | 0.005 | 0.0010 | 0.027 | 0.71 | 0.46 | 0.010 | 0.020 | 0.0012 | 0.0030 |
| 4-G | 0.38 | 0.34 | 0.50 | 0.005 | 0.0010 | 0.027 | 0.64 | 0.71 | 0.010 | 0.020 | 0.0012 | 0.0030 |
| 4-H | 0.28 | 0.24 | 0.48 | 0.005 | 0.0010 | 0.027 | 1.10 | 0.53 | 0.010 | 0.020 | 0.0012 | 0.0030 |
| 4-I | 0.31 | 0.26 | 0.46 | 0.005 | 0.0010 | 0.027 | 0.76 | 0.54 | 0.010 | 0.020 | 0.0012 | 0.0030 |
| 4-J | 0.24 | 0.25 | 0.43 | 0.005 | 0.0010 | 0.027 | 1.03 | 0.33 | 0.010 | 0.020 | 0.0012 | 0.0030 |

TABLE 7-continued

| | | | | | | | | | | | | |
|---|---|---|---|---|---|---|---|---|---|---|---|---|
| 4-K | 0.33 | 0.34 | 0.46 | 0.005 | 0.0010 | 0.027 | 0.78 | 0.77 | 0.010 | 0.020 | 0.0012 | 0.0030 |
| 4-L | 0.31 | 0.27 | 0.49 | 0.005 | 0.0008 | 0.027 | 1.02 | 0.12 | 0.010 | 0.020 | 0.0012 | 0.0030 |
| 4-M | 0.27 | 0.35 | 0.42 | 0.004 | 0.0050 | 0.025 | 1.01 | 0.74 | 0.006 | 0.020 | 0.0012 | 0.0025 |
| 4-N | 0.25 | 0.35 | 0.44 | 0.005 | 0.0008 | 0.027 | 1.05 | 0.68 | 0.010 | 0.020 | 0.0012 | 0.0030 |

| | Chemical Composition (Unit is mass %: balance is Fe and Impurities) | | | | | | | | | |
|---|---|---|---|---|---|---|---|---|---|---|
| Steel | O | V | Ca | Mg | Zr | REM | Co | W | Ni | Cu |
| 4-A | 0.0012 | 0.09 | — | — | — | — | — | — | — | 0.04 |
| 4-B | 0.0015 | 0.09 | — | — | — | — | — | — | 0.03 | — |
| 4-C | 0.0012 | 0.09 | 0.0012 | — | — | — | — | — | — | — |
| 4-D | 0.0012 | 0.09 | — | 0.0011 | — | — | — | — | — | — |
| 4-E | 0.0012 | 0.09 | — | — | — | 0.0011 | — | — | — | — |
| 4-F | 0.0012 | 0.09 | — | — | 0.0013 | — | — | — | — | — |
| 4-G | 0.0012 | 0.09 | — | — | — | — | 0.60 | — | — | — |
| 4-H | 0.0012 | 0.09 | — | — | — | — | — | 0.70 | — | — |
| 4-I | 0.0012 | 0.09 | — | — | — | 0.0012 | 1.10 | — | — | — |
| 4-J | 0.0012 | 0.09 | — | — | — | — | 0.50 | — | 0.03 | — |
| 4-K | 0.0055 | 0.09 | — | — | — | — | — | — | — | — |
| 4-L | 0.0012 | 0.09 | — | — | — | — | — | — | — | — |
| 4-M | 0.0012 | 0.09 | — | — | — | — | — | — | — | — |
| 4-N | 0.0012 | 0.09 | — | — | — | — | — | — | — | — |

Billets each having an outer diameter of 310 to 360 mm were produced using the aforementioned molten steels. The produced billets were heated at 1250° C., and thereafter were hot rolled to produce seamless steel pipes each having an outer diameter of 244.48 to 346.08 mm and a wall thickness of 13.84 to 15.88 mm. From the produced seamless steel pipes, sample materials that were large enough to allow test specimens used in the evaluation test that is described later to be taken, and had a thickness of 13.84 to 15.88 mm were taken.

Quenching and tempering were repeated twice on the sample material of each test number. The quenching temperature (° C.) in the present examples was brought to the temperature of the furnace in which the heating before quenching was performed. In a similar manner to Example 1, the holding time (min) in the present examples was taken as the period of time from the inserting of the sample material of each test number into the heat treatment furnace which the heating before quenching was performed till the extracting. The tempering temperature (° C.) in the present examples was brought to the temperature of the furnace in which tempering was performed. The tempering time (mm) in the present examples was taken as the period of time from the inserting of the sample material of each test number into the heat treatment furnace which tempering was performed till the extracting.

Specifically, the sample material of each test number was held at a quenching temperature of 920° C. for 10 minutes. The sample material of each test number after the holding was immersed in a water bath to perform water cooling. At this time, the cooling rate during quenching $CR_{800-500}$ of the first quenching was 300° C./min for the sample material of each test number. The cooling rate during quenching $CR_{800-500}$ was determined based on a temperature that was measured by a type K thermocouple of a sheath type that was inserted into the center portion of the thickness of the sample material in advance.

The first tempering was performed on the sample material of each test number after the first quenching. In the first tempering, the sample material of each test number was held at the tempering temperature of 700° C. for the tempering time of 30 minutes, and thereafter was allowed to cool to normal temperature.

The second tempering was performed on the sample material of each test number after the first quenching and the first tempering. Specifically, in the second quenching performed on the sample material of each test number, the quenching temperature (° C.) and the holding time (min) were as shown in Table 8. The sample material of each test number after the holding was immersed in a water bath to perform water cooling. At this time, the cooling rate during quenching $CR_{800-500}$ of the second quenching was 300° C./min.

TABLE 8

| | | Quenching | | | Tempering | | | | | | SSC Resistance | | | |
|---|---|---|---|---|---|---|---|---|---|---|---|---|---|---|
| | | Quenching Temperature (° C.) | Holding Time (min) | $HR_{100-600}$ (° C./min) | Tempering Temperature (° C.) | Tempering Time (min) | $CR_{600-200}$ (° C./sec) | YS (MPa) | TS (MPa) | YR (%) | Proportion Of KAM ≤1° (area %) | $K_{1SSC}$ (MPa√m) | | |
| Test Number | Steel | | | | | | | | | | | 1 | 2 | 3 | Average value |
| 4-1 | 4-A | 920 | 10 | 25 | 670 | 30 | 17 | 1034 | 1089 | 95 | 55 | 31 | 28 | 29 | 29 |
| 4-2 | 4-B | 900 | 15 | 25 | 675 | 30 | 36 | 972 | 1020 | 95 | 54 | 32 | 30 | 33 | 32 |
| 4-3 | 4-C | 920 | 10 | 20 | 670 | 30 | 24 | 1007 | 1069 | 94 | 44 | 27 | 29 | 29 | 28 |
| 4-4 | 4-D | 920 | 15 | 20 | 670 | 30 | 25 | 1034 | 1089 | 95 | 39 | 24 | 30 | 30 | 28 |
| 4-5 | 4-E | 920 | 10 | 15 | 670 | 30 | 39 | 1014 | 1069 | 95 | 41 | 27 | 24 | 27 | 26 |
| 4-6 | 4-F | 920 | 10 | 20 | 670 | 40 | 58 | 1007 | 1082 | 93 | 35 | 25 | 29 | 26 | 27 |
| 4-7 | 4-G | 920 | 10 | 20 | 670 | 30 | 14 | 1020 | 1096 | 93 | 42 | 30 | 29 | 26 | 28 |
| 4-8 | 4-H | 920 | 10 | 20 | 670 | 60 | 11 | 993 | 1055 | 94 | 46 | 31 | 33 | 24 | 29 |
| 4-9 | 4-I | 920 | 10 | 10 | 670 | 30 | 5 | 1020 | 1096 | 93 | 25 | 21 | 18 | 23 | 21 |
| 4-10 | 4-J | 920 | 10 | 25 | 670 | 30 | 38 | 979 | 1041 | 94 | 48 | 34 | 31 | 29 | 31 |

TABLE 8-continued

| | | Quenching | | | Tempering | | | | | | Proportion Of | SSC Resistance $K_{1SSC}$ (MPa√m) | | | |
|---|---|---|---|---|---|---|---|---|---|---|---|---|---|---|---|
| Test Number | Steel | Quenching Temperature (° C.) | Holding Time (min) | $HR_{100\text{-}600}$ (° C./min) | Tempering Temperature (° C.) | Tempering Time (min) | $CR_{600\text{-}200}$ (° C./sec) | YS (MPa) | TS (MPa) | YR (%) | KAM ≤1° (area %) | 1 | 2 | 3 | Average value |
| 4-11 | 4-K | 920 | 10 | 10 | 670 | 30 | 5 | 1014 | 1103 | 92 | 21 | 16 | 19 | 24 | 20 |
| 4-12 | 4-L | 920 | 10 | 25 | 670 | 30 | 45 | 979 | 1027 | 95 | 48 | 24 | 24 | 21 | 23 |
| 4-13 | 4-M | 920 | 10 | 25 | 670 | 30 | 60 | 986 | 1062 | 93 | 40 | 20 | 21 | 21 | 21 |
| 4-14 | 4-B | 920 | 10 | 10 | 670 | 30 | 25 | 979 | 1076 | 91 | 20 | 18 | 21 | 22 | 20 |
| 4-15 | 4-B | 900 | 15 | 25 | 675 | 30 | 1 | 999 | 1087 | 92 | 24 | 19 | 23 | 18 | 20 |
| 4-16 | 4-N | 920 | 15 | 20 | 670 | 30 | 25 | 982 | 1025 | 96 | 45 | 32 | 30 | 29 | 30 |

Next, the second tempering was performed on the sample material of each test number after the second quenching. Specifically, in the second tempering performed on a sample material of each test number, the heating rate during tempering $HR_{100\text{-}600}$ (° C./min), the tempering temperature (° C.), and the tempering time (min) were as shown in Table 8.

After the heat treatment was performed at each tempering temperature, the sample material of each test number was cooled. For the cooling, controlled cooling by mist water cooling from both sides of the steel material was performed. In tempering performed on the sample material of each test number, the cooling rate after tempering $CR_{600\text{-}200}$ (° C./sec) was those shown in Table 8. Note that, the heating rate during tempering $HR_{100\text{-}600}$ (° C./min) and the cooling rate after tempering $CR_{600\text{-}200}$ were determined based on a temperature that was measured by a type K thermocouple of a sheath type that was inserted into the center portion of the thickness of the sample material in advance.

[Evaluation Tests]

The tensile test, the microstructure determination test, the KAM value measurement test, and the SSC resistance test that are described hereunder were performed on the sample material of each test number after the aforementioned tempering.

[Tensile Test]

A tensile test was performed in accordance with ASTM E8 (2013) in a similar manner to Example 1. The tensile test was performed in the atmosphere at normal temperature (25° C.) using the round bar test specimen of each test number prepared in a similar manner to Example 1, and the yield strength (MPa) and the tensile strength (MPa) were obtained.

Note that, in Example 4, the 0.65% proof stress obtained in the tensile test was defined as the yield strength of each test number. The maximum stress in a uniform elongation was defined as the tensile strength. The ratio (YS/TS) between the determined yield strength (YS) and the determined tensile strength (TS) was defined as the yield ratio YR (%). The determined yield strength (YS), the determined tensile strength (TS), and the determined yield ratio (YR) are shown in Table 8.

[Microstructure Determination Test]

The sample material of each test number had a yield strength within the range of 965 to 1069 MPa (140 ksi grade) and a yield ratio of 85% or more. Therefore, in the microstructure of the sample material of each test number, it was determined that the total volume ratio of the tempered martensite and the tempered bainite was 95% or more.

[KAM Value Measurement Test]

The proportion of KAM values of 1° or less was determined for the sample material of each test number. The proportion of KAM values of 1° or less was determined by the aforementioned method. The determined proportion of KAM values of 1° or less is shown in Table 8 as "PROPORTION OF KAM≤1° (area %)".

[SSC Resistance Test]

A DCB test in accordance with "Method D" of NACE TM0177-2005 was conducted using the sample material of each test number, and the SSC resistance was evaluated. In a similar manner to Example 3, three DCB test specimens illustrated in FIG. 1A were prepared from the center portion of the thickness of the sample material of each test number. The longitudinal direction of the DCB test specimen was parallel to the rolling direction of the sample material (that is, the axial direction of the seamless steel pipe). In addition, a wedge illustrated in FIG. 1B was prepared from the sample material of each test number. The wedge had a thickness t of 3.13 mm. The aforementioned wedge was driven between arms of the DCB test specimen.

A mixed aqueous solution containing 5.0 mass % of sodium chloride and 0.4 mass % of sodium acetate that was adjusted to pH 4.0 using acetic acid was employed as the test solution. The test solution is poured into the test vessel with the DCB test specimen with the wedge driven enclosed in a manner so as to leave a vapor phase portion, and adopted as a test bath. After the test bath was degassed, a gaseous mixture of 0.003 atm $H_2S$ and 0.997 atm $CO_2$ was blown into the test vessel to make the test bath a corrosive environment. The inside of the test vessel was held at a temperature of 4° C. for 408 hours (17 days) while stirring the test bath. After being held, the DCB test specimen was taken out from the test vessel.

The method for determining the fracture toughness value $K_{1SSC}$ (MPa√m) from the taken DCB test specimen was performed in a similar manner to Example 3. An average of the fracture toughness values of the three determined fracture toughness values $K_{1SSC}$ (MPa√m) was determined, and defined as the fracture toughness value $K_{1SSC}$ (MPa√m) of the steel pipe of the test number. The fracture toughness values $K_{1SSC}$ obtained for the sample material of each test number are shown in Table 8. When the fracture toughness value $K_{1SSC}$ value defined above was 24 MPa√m or more, the result of the DCB test on the seamless steel pipe was determined as being good.

[Test Results]

The test results are shown in Table 8.

Referring to Table 7 and Table 8, the chemical composition of the respective sample materials of Test Numbers 4-1 to 4-8, 4-10, and 4-16 was appropriate, the yield strength was within the range of 965 to 1069 MPa (140 ksi grade), and the yield ratio was 85% or more. In addition, the proportion of KAI 51° was 30 area % or more. As a result, the fracture toughness value $K_{1SSC}$ was 24 MPa√m or more, and the sample materials exhibited excellent SSC resistance.

On the other hand, for the sample material of Test Number 4-9, the heating rate during tempering $HR_{100-600}$ was too low. Therefore, the proportion of KAM 1° was less than 30 area %. As a result, the fracture toughness value $K_{1SSC}$ was less than 24 MPa√m and the sample material did not exhibit excellent SSC resistance.

In the sample material of Test number 4-11, the O content was too high. In addition, the heating rate during tempering $HR_{100-600}$ was too low. Therefore, the proportion of KAM≤1° was less than 30 area %. As a result, the fracture toughness value $K_{1SSC}$ was less than 24 MPa√m, and the sample material did not exhibit excellent SSC resistance.

In the sample material of Test number 4-12, the Mo content was too low. As a result, the facture toughness value $K_{1SSC}$ was less than 24 MPa√n, and the sample material did not exhibit excellent SSC resistance.

In the sample material of Test number 4-13, the S content was too high. As a result, the facture toughness value $K_{1SSC}$ was less than 24 MPa√n, and the sample material did not exhibit excellent SSC resistance.

For the sample material of Test Number 4-14, the heating rate during tempering $HR_{100-600}$ was too low. Therefore, the proportion of KAM≤1° was less than 30 area %. As a result the fracture toughness value $K_{1SSC}$ was less than 24 MPa√m, and the sample material did not exhibit excellent SSC resistance.

For the sample material of Test Number 4-15, the cooling rate after tempering $CR_{600-200}$ was too low. Therefore, the proportion of KAM≤1° was less than 30 area %. As a result, the fracture toughness value $K_{1SSC}$ was less than 24 MPa√m, and the sample material did not exhibit excellent SSC resistance.

An embodiment of the present invention has been described above. However, the embodiment described above is merely an example for implementing the present invention. Accordingly, the present invention is not limited to the above embodiment, and the above embodiment can be appropriately modified and performed within a range that does not deviate from the gist of the present invention.

INDUSTRIAL APPLICABILITY

The steel material according to the present invention is widely applicable to steel materials to be utilized in, a sour environment and preferably can be utilized as a steel material for oil well that is utilized in an oil well environment, and further preferably can be utilized as oil well steel pipes for casing, tubing or line pipes or the like.

The invention claimed is:

1. A steel material comprising:
a chemical composition consisting of, in mass %,
C: 0.20 to 0.50%,
Si: 0.05 to 0.50%,
Mn: 0.05 to 1.00%,
P: 0.030% or less,
S: less than 0.0050%,
Al: 0.005 to 0.050%,
Cr: 0.10 to 1.50%,
Mo: 0.25 to 1.80%,
Ti: 0.002 to 0.050%,
Nb: 0.002 to 0.100%,
B: 0.0001 to 0.0050%,
N: 0.0070% or less,
O: less than 0.0050%,
V: 0 to 0.30%,
Ca: 0 to 0.0100%,
Mg: 0 to 0.0100%,
Zr: 0 to 0.0100%,
rare earth metal: 0 to 0.0100%,
Co: 0 to 1.50%,
W: 0 to 1.50%,
Ni: 0 to 0.50%,
Cu: 0 to 0.50%, and
with the balance being Fe and impurities, wherein
a yield strength is within a range of 655 to 1069 MPa,
a yield ratio is 85% or more,
a proportion of KAM values of 1° or less is 30 area % or more,
in a case where the yield strength is within a range of 655 to less than 862 MPa, the proportion of KAM values of 1° or less is 40 area % or more,
in a case where the yield strength is within a range of 862 to less than 965 MPa, the proportion of KAM values of 1° or less is 35 area % or more, and
in a case where the yield strength is within a range of 965 to 1069 MPa, the proportion of KAM values of 1° or less is 30 area % or more.

2. The steel material according to claim 1, wherein the chemical composition contains:
V: 0.01 to 0.30%.

3. The steel material according to claim 1, wherein the chemical composition contains one or more types of element selected from the group consisting of:
Ca: 0.0001 to 0.0100%,
Mg: 0.0001 to 0.0100%,
Zr: 0.0001 to 0.0100%, and
rare earth metal: 0.0001 to 0.0100%.

4. The steel material according to claim 1, wherein the chemical composition contains one or more types of element selected from the group consisting of:
Co: 0.02 to 1.50%, and
W: 0.02 to 1.50%.

5. The steel material according to claim 1, wherein the chemical composition contains one or more types of element selected from the group consisting of:
Ni: 0.02 to 0.50%, and
Cu: 0.02 to 0.50%.

6. The steel material according to claim 1, wherein
the yield strength is within a range of 655 to less than 758 MPa, and
the proportion of KAM values of 1° or less is 40 area % or more.

7. The steel material according to claim 1, wherein
the yield strength is within a range of 758 to less than 862 MPa, and
the proportion of KAM values of 1° or less is 40 area % or more.

8. The steel material according to claim 1, wherein
the yield strength is within a range of 862 to less than 965 MPa, and
the proportion of KAM values of 1° or less is 35 area % or more.

9. The steel material according to claim 1, wherein
the yield strength is within a range of 965 to 1069 MPa, and
the proportion of KAM values of 1° or less is 30 area % or more.

10. The steel material according to claim 1, wherein the steel material is an oil-well steel pipe.

11. The steel material according to claim 1, wherein the steel material is a seamless steel pipe.

* * * * *

UNITED STATES PATENT AND TRADEMARK OFFICE
CERTIFICATE OF CORRECTION

PATENT NO. : 11,434,554 B2
APPLICATION NO. : 17/044616
DATED : September 6, 2022
INVENTOR(S) : Hiroki Kamitani et al.

It is certified that error appears in the above-identified patent and that said Letters Patent is hereby corrected as shown below:

In the Specification

In Column 30, Table 2, under Tempering, delete "$HR_{100-800}$" and insert --$HR_{100-600}$-- therefor.

In Column 30, Table 2, under Tempering, delete "$CR_{800-200}$" and insert --$CR_{600-200}$-- therefor.

In Column 33, Table 3, last line of Column N, delete "0.8025" and insert --0.0025-- therefor.

In Column 35, Table 4, under Tempering, 1$^{st}$ Column, delete "$HR_{100-800}$" and insert --$HR_{100-600}$-- therefor.

In Column 35, Table 4, under Tempering, 4$^{th}$ Column, delete "$CR_{800-200}$" and insert --$CR_{600-200}$-- therefor.

In Column 39, Table 5-continued, Line 3-J, Column Nb, delete "0.025" and insert --0.002-- therefor.

In Column 39, Table 5-continued, Line 3-N, Column O, delete "0.0015" and insert --0.0050-- therefor.

In Column 41, Table 6, under Tempering, Line 3-6, Column Tempering Temperature (°C.), delete "655" and insert --695-- therefor.

In Column 41, Table 6, under Tempering, 8$^{th}$ Column, delete "$CR_{800-200}$" and insert --$CR_{600-200}$-- therefor.

Signed and Sealed this
Thirteenth Day of December, 2022

Katherine Kelly Vidal
*Director of the United States Patent and Trademark Office*